(12) United States Patent
Xu et al.

(10) Patent No.: US 12,739,897 B2
(45) Date of Patent: Sep. 15, 2026

(54) COMMUNICATION METHOD AND APPARATUS

(71) Applicant: Huawei Technologies Co., Ltd., Shenzhen (CN)

(72) Inventors: Yishan Xu, Shanghai (CN); Shiyong Tan, Shenzhen (CN); Hualin Zhu, Shanghai (CN); Chuan Ma, Shanghai (CN); He Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 18/415,324

(22) Filed: Jan. 17, 2024

(65) Prior Publication Data

US 2024/0155705 A1 May 9, 2024

Related U.S. Application Data

(63) Continuation of application No. PCT/CN2022/105550, filed on Jul. 13, 2022.

(30) Foreign Application Priority Data

Jul. 19, 2021 (CN) ......................... 202110812409.3

(51) Int. Cl.
*H04W 76/10* (2018.01)
*H04L 1/1607* (2023.01)
(Continued)

(52) U.S. Cl.
CPC ........... *H04W 76/10* (2018.02); *H04L 1/1642* (2013.01); *H04W 8/20* (2013.01); *H04W 8/22* (2013.01); *H04W 48/18* (2013.01)

(58) Field of Classification Search
CPC ......... H04W 76/10; H04W 8/20; H04W 8/22; H04L 1/1642
See application file for complete search history.

(56) References Cited

U.S. PATENT DOCUMENTS

2009/0003831 A1* 1/2009 Zheng ................. H04L 65/1043 398/115
2017/0104758 A1 4/2017 Jin
(Continued)

FOREIGN PATENT DOCUMENTS

| | | | |
|---|---|---|---|
| EP | 3720203 | A1 | 10/2020 |
| EP | 3731464 | A1 | 10/2020 |
| WO | 2015035640 | A1 | 3/2015 |
| WO | 2020201207 | A1 | 10/2020 |
| WO | 2020238327 | A1 | 12/2020 |

OTHER PUBLICATIONS

3GPP TR 21.916 v0.6.0, 3rd Generation Partnership Project; Release 16 Description, Summary of Release-16 Work Items. (Year: 2020).*
(Continued)

*Primary Examiner* — Mohammad S Anwar
(74) *Attorney, Agent, or Firm* — Slater Matsil, LLP

(57) ABSTRACT

An access network device obtains first information, where the access network device supports a 3rd generation partnership project 3GPP access technology; the access network device establishes a user plane connection to a first terminal device based on the first information; and the access network device obtains user plane data of the first terminal device via the user plane connection, and sends the user plane data to a first fixed network gateway device.

20 Claims, 18 Drawing Sheets

(51) Int. Cl.

| | |
|---|---|
| ***H04W 8/20*** | (2009.01) |
| ***H04W 8/22*** | (2009.01) |
| ***H04W 48/18*** | (2009.01) |

(56) References Cited

U.S. PATENT DOCUMENTS

| | | | | |
|---|---|---|---|---|
| 2017/0244705 | A1 | 8/2017 | Ha et al. | |
| 2019/0239133 | A1* | 8/2019 | Yu | H04W 36/00695 |
| 2020/0053131 | A1* | 2/2020 | Li | H04L 61/5007 |
| 2020/0163012 | A1 | 5/2020 | Zhu et al. | |
| 2020/0259681 | A1 | 8/2020 | Li | |
| 2020/0329514 | A1 | 10/2020 | Yu et al. | |
| 2020/0404499 | A1 | 12/2020 | Zhu et al. | |
| 2021/0168905 | A1 | 6/2021 | Yu | |
| 2021/0185527 | A1 | 6/2021 | Li et al. | |

OTHER PUBLICATIONS

3GPP TR 21.916 V0.6.0 (Sep. 2020). "3rd Generation Partnership Project; Technical Specification Group Services and System Aspects; Release 16 Description; Summary of Rel-16 Work Items (Release 16)". total 118 pages.

3GPP TS 23.501 V17.1.0 (Jun. 2021), 3rd Generation Partnership Project; Technical Specification Group Services and System Aspects; System architecture for the 5G System (5GS); Stage 2 (Release 17), total 526 pages.

3GPP TR 21.916 V0.6.0 (Sep. 2020), 3rd Generation Partnership Project; Technical Specification Group Services and System Aspects; Release 16 Description; Summary of Rel-16 Work Items (Release 16), 3GPP Draft; CP-202232, 3GPP, Sep. 15, 2020, total 117 pages.

* cited by examiner

Fixed network terminal

Access node

BNG

IPoE/ PPPoE 802.1ad

Ethernet

PHY 802.1ad

Ethernet

PHY 802.1ad

Ethernet

PHY

IPoE/ PPPoE 802.1ad

Ethernet

PHY

COMMUNICATION METHOD AND APPARATUS

CROSS-REFERENCE TO RELATED APPLICATIONS

This application is a continuation of International Application No. PCT/CN2022/105550, filed on Jul. 13, 2022, which claims priority to Chinese Patent Application No. 202110812409.3, filed on Jul. 19, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

A fixed network provides broadband services for places such as a home and a shop by using fixed lines. At present, a terminal in the fixed network, for example, customer-premises equipment (CPE), needs to access the fixed network in a wireline manner such as an optical fiber, and communicates with a broadband network gateway (BNG) in the fixed network by using an Internet protocol over Ethernet (IPoE) or a point-to-point protocol over Ethernet (PPPoE).

In some remote areas, optical fibers are difficult to lay, and a fiber to the home rate is low. A manner of obtaining broadband services through wireline access is not applicable to these areas. How to use broadband services in areas where optical fibers are difficult to lay becomes a problem worth studying.

SUMMARY

Embodiments of this application provide a communication method and apparatus, so that an access network device supporting the 3$^{rd}$ generation partnership project (3GPP) provides a manner of wireless access to a fixed network and a bandwidth service.

According to a first aspect, an embodiment of this application provides a communication method, including: An access network device obtains first information, where the access network device supports a 3GPP access technology; the access network device establishes a user plane connection to a first terminal device based on the first information; and the access network device obtains user plane data of the first terminal device via the user plane connection, and sends the user plane data to a first fixed network gateway device.

In this embodiment of this application, the access network device supporting the 3GPP access technology is used as an intermediate node between a terminal device and a fixed network gateway device, the terminal device establishes a connection to the access network device by using the 3GPP access technology, and the access network device can transmit data of the terminal device to the fixed network gateway device, so that the terminal device can also obtain a fixed network broadband service in a 3GPP access manner. Compared with a conventional manner in which a fixed network terminal accesses a fixed network in a wireline manner, the 3GPP access manner can simplify deployment, enhance coverage, and improve performance of a communication system.

In a possible design, the first information indicates that a type of the first terminal device is a target type and/or indicates that the first terminal device is allowed to obtain a service by using the first fixed network gateway device. The target type includes one or more of a residential gateway, a home terminal, and customer-premises equipment.

In a possible design, the first information is from the first terminal device, and the first information indicates that the type of the first terminal device is the target type. In another possible design, the first information is pre-configured in the access network device or the first information is from the first fixed network gateway device. The first information includes subscription data information corresponding to the first terminal device, and the subscription data information is used to determine that the first terminal device is allowed to obtain the service by using the first fixed network gateway device. This manner to establish the user plane connection can simplify an access procedure of the terminal device, reduce signaling overheads, and reduce costs.

In a possible design, the method further includes: The access network device sends second information to the first fixed network gateway device, where the second information is used to request to manage a connection between the first terminal device and the first fixed network gateway device. The management can include establishment, modification, release, deletion, or the like.

In a possible design, the access network device receives third information from the first fixed network gateway device. The third information includes at least one of the following: identification information of the first terminal device; authentication information of the first terminal device, where the authentication information indicates that the first terminal device passes authentication of a fixed network corresponding to the first fixed network gateway device; subscription data information corresponding to the first terminal device, where the subscription data information includes one or more pieces of fixed network service information, quality of service QoS information, and priority information; and security context information of the first terminal device, where the security context information is used to establish a security connection between the access network device and the first terminal device. A specific user plane connection management procedure is performed on the terminal device based on a related feature of the terminal device, for example, the subscription data information corresponding to the terminal device. This can improve user experience.

In a possible design, the access network device performs the user plane connection management procedure based on the third information. The user plane management procedure includes at least one of the following operations: establishing a user plane resource, modifying a user plane resource, or releasing a user plane resource.

In a possible design, the access network device establishes a connection with at least one fixed network gateway device. The at least one fixed network gateway device includes the first fixed network gateway device.

In a possible design, the method further includes: The access network device obtains fourth information from the first terminal device, where the fourth information is used to determine security context information of the first terminal device; and the access network device establishes, based on the fourth information, the security connection between the access network device and the first terminal device by using the security context information of the first terminal device. The security connection between the access network device and the terminal device is established by using the security context information of the terminal device, so that communication security can be improved.

In a possible design, the fourth information includes a first sequence number corresponding to the security context information of the first terminal device. That the access network device establishes, based on the fourth information, the security connection between the access network device and the first terminal device by using the security context information of the first terminal device includes: The access network device obtains security context information of at least one terminal device and an identifier set, where the identifier set includes a first sequence number set used to indicate the security context information of the at least one terminal device, and the first sequence number set includes the first sequence number; the access network device obtains, based on the first sequence number, the security context information of the first terminal device from the security context information of the at least one terminal device; and the access network device establishes the security connection between the access network device and the first terminal device by using the security context information of the first terminal device.

In a possible design, the identifier set further includes a second sequence number set. After the access network device establishes the security connection between the access network device and the first terminal device by using security context information of the first terminal device, the method further includes: replacing the first sequence number with a second sequence number in the second sequence number set, and sending the second sequence number to the first terminal device, where the second sequence number is used to indicate the security context information of the first terminal device. After an authentication procedure is completed, a sequence number of the security context information is updated, so that an identifier or an index number of the security context dynamically changes. This further improves communication security.

In a possible design, the fourth information further includes identification information of the fixed network corresponding to the first fixed network gateway device.

In a possible design, the method further includes: The access network device sends at least one piece of the following information:

capability information of the access network device, where the capability information indicates that the access network device supports fixed network transmission; identification information of a fixed network supported by the access network device, where the fixed network supported by the access network device includes the fixed network corresponding to the first fixed network gateway device; and network priority information, where the network priority information indicates a priority of a mobile operator to which the access network device belongs.

In a possible design, the method further includes:

The access network device obtains information that is sent by the first terminal device and that indicates that the type of the first terminal device is the target type and/or identification information of a fixed network that the first terminal device requests to access; and the access network device determines, based on the type of the first terminal device and/or the identification information of the fixed network that the first terminal device requests to access, that the access network device supports fixed network transmission of the first terminal device.

According to a second aspect, an embodiment of this application provides a communication apparatus, used in an access network device supporting a 3GPP access technology. The communication apparatus may be the access network device, or may be an apparatus in the access network device, or may be an apparatus that can be used together with the access network device. In a design, the communication apparatus may include modules for performing the method/operations/steps/actions described in the first aspect. The modules may be hardware circuits, may be software, or may be implemented by using a combination of a hardware circuit and software. In a design, the communication apparatus may include a processing module and a communication module. For example, a communication module, configured to obtain first information; and a processing module, configured to establish a user plane connection to a first terminal device based on the first information, where the communication module is further configured to: obtain user plane data of the first terminal device via the user plane connection, and send the user plane data to a first fixed network gateway device.

In this embodiment of this application, the access network device supporting the 3GPP access technology is used as an intermediate node between a terminal device and a fixed network gateway device, the terminal device establishes a connection to the access network device by using the 3GPP access technology, and the access network device can transmit data of the terminal device to the fixed network gateway device, so that the terminal device can also obtain a fixed network broadband service in a 3GPP access manner. Compared with a conventional manner in which a fixed network terminal accesses a fixed network in a wireline manner, the 3GPP access manner can simplify deployment, enhance coverage, and improve performance of a communication system.

In a possible design, the first information indicates that a type of the first terminal device is a target type and/or indicates that the first terminal device is allowed to obtain a service by using the first fixed network gateway device. The target type includes one or more of a residential gateway, a home terminal, and customer-premises equipment, and may further include a mobile phone, an AR terminal/a VR terminal, a Pad, and another type of terminal. This is not limited in embodiments of this application.

In a possible design, the first information is from the first terminal device, and the first information indicates that the type of the first terminal device is the target type.

In a possible design, the first information is pre-configured in the access network device or the first information is from the first fixed network gateway device. The first information includes subscription data information corresponding to the first terminal device, and the subscription data information is used to determine that the first terminal device is allowed to obtain the service by using the first fixed network gateway device.

In a possible design, the communication module is further configured to send second information to the first fixed network gateway device. The second information is used to request to manage a connection between the first terminal device and the first fixed network gateway device.

The management can include establishment, modification, release, deletion, or the like. In a possible design, the communication module is further configured to receive third information from the first fixed network gateway device. The third information includes at least one of the following: identification information of the first terminal device; authentication information of the first terminal device, where the authentication information indicates that the first terminal device passes authentication of a fixed network corresponding to the first fixed network gateway device; subscription data information corresponding to the first terminal device, where the subscription data information includes one or more pieces of fixed network service information, QoS information, and priority information; and security context information of the first terminal device, where the security context information is used to establish a security connection between the access network device and the first terminal device.

In a possible design, the processing module is further configured to perform a user plane connection management procedure based on the third information. The user plane management procedure includes at least one of the following operations: establishing a user plane resource, modifying a user plane resource, or releasing a user plane resource.

In a possible design, the access network device establishes a connection with at least one fixed network gateway device. The at least one fixed network gateway device includes the first fixed network gateway device.

In a possible design, the communication module is further configured to obtain fourth information from the first terminal device. The fourth information is used to determine security context information of the first terminal device. The processing module is further configured to establish, based on the fourth information, the security connection between the access network device and the first terminal device by using the security context information of the first terminal device.

In a possible design, the fourth information includes a first sequence number corresponding to the security context information of the first terminal device. The processing module is further configured to: obtain, by using the communication module, security context information of at least one terminal device and an identifier set, where the identifier set includes a first sequence number set used to indicate the security context information of the at least one terminal device, and the first sequence number set includes the first sequence number; obtain, based on the first sequence number, the security context information of the first terminal device from the security context information of the at least one terminal device; and establish the security connection between the access network device and the first terminal device by using the security context information of the first terminal device.

In a possible design, the identifier set further includes a second sequence number set. The processing module is further configured to: after establishing the security connection between the access network device and the first terminal device by using the security context information of the first terminal device, replace the first sequence number with a second sequence number in the second sequence number set. The communication module is further configured to send the second sequence number to the first terminal device, where the second sequence number is used to indicate the security context information of the first terminal device.

In a possible design, the fourth information further includes identification information of the fixed network corresponding to the first fixed network gateway device.

In a possible design, the communication module is further configured to send at least one piece of the following information: capability information of the access network device, where the capability information indicates that the access network device supports fixed network transmission; identification information of a fixed network supported by the access network device, where the fixed network supported by the access network device includes the fixed network corresponding to the first fixed network gateway device; and network priority information, where the network priority information indicates a priority of a mobile operator to which the access network device belongs.

In a possible design, the communication module is further configured to obtain information that is sent by the first terminal device and that indicates that the type of the first terminal device is the target type and/or identification information of a fixed network that the first terminal device requests to access. The processing module is further configured to determine, based on the type of the first terminal device and/or the identification information of the fixed network that the first terminal device requests to access, that the access network device supports fixed network transmission of the first terminal device.

According to a third aspect, an embodiment of this application provides a communication apparatus. The communication apparatus includes a processor, configured to implement the method according to the first aspect. The communication apparatus may further include a memory, configured to store instructions and data. The memory is coupled to the processor, and when executing the instructions stored in the memory, the processor can implement the method described in the first aspect. The apparatus may further include a communication interface. The communication interface is used by the apparatus to communicate with another device. For example, the communication interface may be a transceiver, a circuit, a bus, a module, or another type of communication interface, and the another device may be a network device. In a possible device, the apparatus includes:

a memory, configured to store program instructions; and a processor, configured to: obtain first information through a communication interface, establish a user plane connection to a first terminal device based on the first information, obtain user plane data of the first terminal device via the user plane connection, and send the user plane data to a first fixed network gateway device.

According to a fourth aspect, an embodiment of this application further provides a computer program. When the computer program runs on a computer, the computer is enabled to perform the method according to the first aspect.

According to a fifth aspect, an embodiment of this application further provides a computer-readable storage medium. The computer-readable storage medium stores a computer program. When the computer program is executed by a computer, the computer is enabled to perform the method according to the first aspect.

According to a sixth aspect, an embodiment of this application further provides a chip. The chip is configured to read a computer program stored in a memory, to perform the method according to the first aspect.

According to a seventh aspect, an embodiment of this application further provides a chip system. The chip system includes a processor, configured to support a computer apparatus in implementing the method according to the first aspect. In a possible design, the chip system further includes a memory. The memory is configured to store a program and data that are necessary for the computer apparatus. The chip system may include a chip, or may include a chip and another discrete device.

For technical effect that can be achieved in the second aspect to the seventh aspect, refer to descriptions of technical effect that can be brought by the corresponding technical solutions in the first aspect. Details are not described herein again.

DETAILED DESCRIPTION OF ILLUSTRATIVE EMBODIMENTS

The following first describes, with reference to FIG. 1 to FIG. 4, technical solutions on wireline access to a fixed network.

Figures 1, 2:
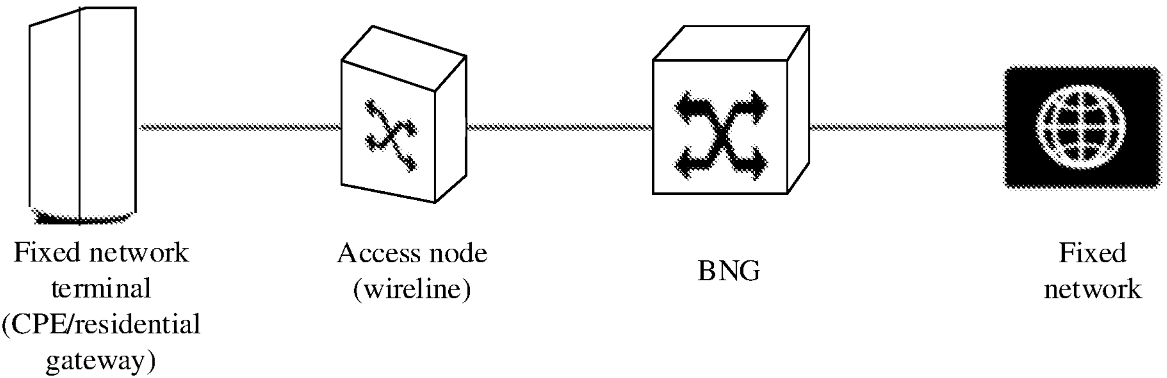
FIG. 1 is a schematic diagram of an architecture of a fixed wireline network.
FIG. 2 is a schematic diagram of a fixed network transmission protocol stack.

FIG. 1 shows an architecture of a fixed wireline network. The fixed wireline network may be simply divided into four parts: a fixed network terminal, an access node (AN), a broadband network gateway (BNG), and a service provider network. The access node in FIG. 1 may also be replaced with an access network (AN), and the access node in FIG. 1 is a wireline access node, and the access network is a wireline access network.

The fixed network terminal may also be referred to as customer-premises equipment (CPE) The CPE may be a device such as a telephone, a router, a network switch, a home gateway (RG), a set top box, a fixed-mobile convergence product, a home network adapter, or an Internet access gateway. The CPE is a device that can receive a mobile signal and/or a broadband signal, and forward the mobile signal and/or the broadband signal as a wireless fidelity (Wi-Fi) signal. For example, the CPE may convert a high-speed 4G or 5G signal into a Wi-Fi signal, or the CPE may convert a broadband signal into a Wi-Fi signal. The CPE can support a large quantity of mobile terminals to simultaneously access the Internet. The mobile terminal may be a device that can access the Internet based on Wi-Fi, such as a notebook computer, a mobile phone, a tablet computer, or a web television. The CPE supports wireline access, for example, wireline access to a fixed wireline network (such as a wireline broadband network). The CPE also supports wireless access. Wireless access can be understood as accessing a mobile network through a $3^{rd}$ generation partnership project (3GPP) access type.

The access node (AN) is a node in a switching network for a user transmission signal to access or exit a communication network. The access node can implement a plurality of functions, such as protocol conversion and code conversion, providing an access entry of object storage, verifying authentication and authorization information of user requests, and writing data to underlying storage nodes. The access node may include an Ethernet access node supporting Ethernet-based subscriber lines and uplinks to Ethernet-based aggregation networks, and (MAC)-forced forwarding. The wireline access network includes a wireline access node and an optional form of aggregation.

The broadband network gateway (BNG) is an Internet protocol (IP) edge node, and can be divided into a broadband remote access server (BRAS) and a service router (SR). The BRAS can be used as an ingress of traditional Internet services, and the SR can be used as an ingress of new top-quality services. Similar to the BRAS, the SR terminates and manages a PPPoE/an IPoE session of a user (CPE).

FIG. 2 shows a fixed network transmission protocol stack. The fixed network terminal accesses the fixed network in a wireline manner by using the access node. For example, the fixed network terminal is connected to the access node through an optical cable, and the access node is connected to the BNG through an optical cable. The fixed network terminal can communicate with the BNG through an IPoE protocol or a PPPoE protocol. If the terminal device uses IPoE, the terminal needs to perform an authentication procedure and obtain an IP address. If the terminal uses PPPoE, the terminal establishes a PPPoE connection to the BNG, and obtains a PPPoE session identifier. In a fixed wireline network structure, the fixed network terminal may convert a wireline broadband network into a Wi-Fi network for use by a notebook computer, a mobile phone, and the like.

The following describes a solution in which the fixed network terminal communicates with the BNG through the IPoE or PPPoE protocol.

Figure 3:
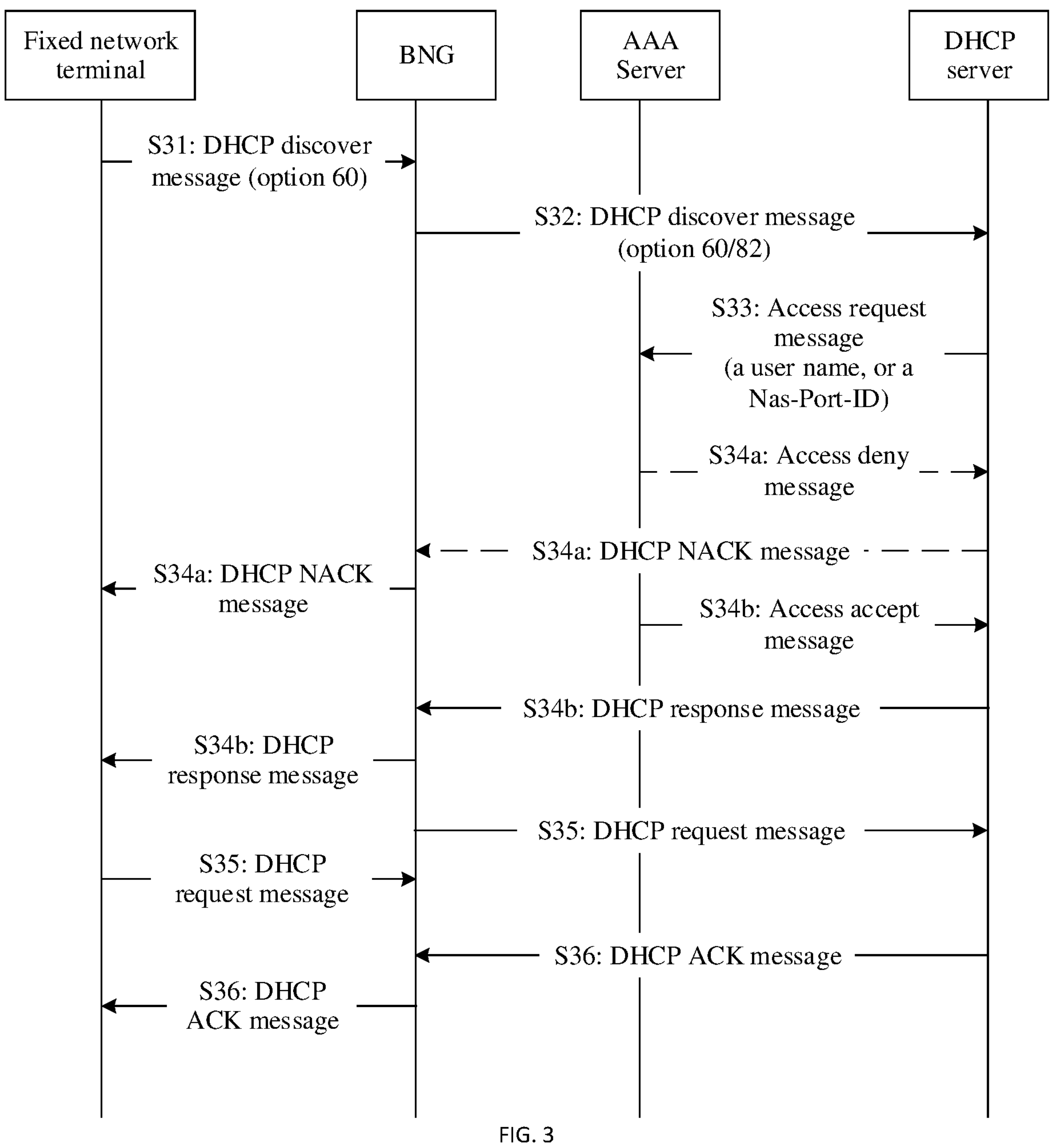
FIG. 3 is a schematic diagram of an IPoE communication procedure.

FIG. 3 shows an IPoE communication procedure, and shows a process of performing IPoE authentication and obtaining an IP address by a fixed network terminal. The process relates to interaction between the fixed network terminal, a BNG (which may be a BRAS or an SR), a dynamic host configuration protocol server (DHCP server), and an authentication, authorization, and accounting (AAA) server. The DHCP server is configured to allocate an IP address to the fixed network terminal that can be authenticated, and the AAA server is configured to perform authentication, for example, authenticate whether the fixed network terminal is allowed to go online, or authenticate whether the fixed network terminal subscribes to a broadband service. Specific steps are as follows:

S31: The fixed network terminal initiates a DHCP discover message, and carries information indicating a type of the fixed network terminal in an Option 60 field in the DHCP discover message. After receiving the DHCP discover message, an access node (AN) may insert information indicating a location of the fixed network terminal device into an option (Option) 82 in the DHCP discover message, and then send the DHCP discover message to the BNG. A procedure of the access node is omitted in FIG. 3.

For example, a Line ID may be inserted into the Option 82 in the DHCP discover message, where the Line ID is determined based on a location, that is, the Line ID is used to indicate the location of the fixed network terminal. For example, a home whose address is Room XX, No. XX, XX Road, XX District, XX City, XX Province corresponds to a Line ID. If a home broadband service is subscribed to for the address, the BNG/AAA may know that a user (that is, the fixed network terminal) corresponding to the Line ID has subscribed the home broadband service, and therefore the fixed network terminal can be authenticated.

S32: After receiving the DHCP discover message sent by the fixed network terminal, the BNG marks corresponding Option 82 information, and sends the DHCP discover message to the DHCP server.

S33: After receiving the DHCP discover message, the DHCP server extracts related information in the DHCP discover message, constructs a username required for authentication and a Nas-Port-ID (or a Line ID) required for authentication, and sends the username and the Nas-Port-ID to the AAA server for authentication through an access request message.

S34: The AAA server attempts to authenticate the fixed network terminal. If the authentication fails, the AAA server feeds back a deny packet such as an access deny message, the DHCP server feeds back a DHCP NACK to the BNG, and the BNG feeds back the DHCP NACK to the fixed network terminal by using the access node (AN); or if the authentication succeeds, the AAA server returns an accept packet such as access accept, the DHCP server allocates an IP address, encapsulates the IP address allocated to the fixed network terminal in a DHCP response message, and sends the DHCP response message to the fixed network terminal through the BNG. Authentication information (Option 125) is further inserted into the DHCP offer message, so that the fixed network terminal can perform authentication on the DHCP offer message and identify whether the DHCP offer message is from a trusted DHCP server.

For example, FIG. 3 shows one possibly performed S34 by using a dashed line, that is, S34*a* in FIG. 3: The DHCP server sends the DHCP NACK to the BNG, and the BNG sends the DHCP NACK to the fixed network terminal by using the access node. The other possible performed S34 is shown by using a solid line, that is, S34*b* in FIG. 3: The DHCP server sends the DHCP response to the BNG, and the BNG sends the DHCP response to the fixed network terminal by using the access node.

S35: Because the DHCP discover message in step S31 is a broadcast message and may be received by a plurality of DHCP servers, in step S34, the plurality of DHCP servers may also allocate IP addresses to the fixed network terminal and send DHCP offer messages; and after receiving the DHCP offer messages from the plurality of DHCP servers, the fixed network terminal may send a DHCP request message based on one of the DHCP offer messages, where the DHCP request message includes the IP address allocated by the DHCP server. The fixed network terminal may send the DHCP request message based on the first received DHCP offer.

For example, assuming that the DHCP response sent by the DHCP server shown in FIG. 3 is first received by the fixed network terminal, S35 in FIG. 3: After receiving the DHCP response, the fixed network terminal may send the DHCP request message to the BNG by using the access node, and then the BNG sends the DHCP request message to the DHCP server.

S36: After receiving the DHCP request message from the fixed network terminal, the DHCP server allocating the IP address identifies, based on the IP address included in the DHCP request message, that the IP address is allocated by the DHCP server, and feeds back a DHCP ACK to the BNG, and then the BNG feeds back the DHCP ACK to the fixed network terminal by using the access node. Similarly, for other DHCP servers that have also allocated the IP address, the DHCP server can know that the IP address is not allocated by the DHCP server, and release the allocated IP address, and does not need to feed back a response message to the fixed network terminal.

Through the foregoing steps, the fixed network terminal can be authenticated, obtains the IP address, and can send or receive service flow data.

Figures 4, 5:
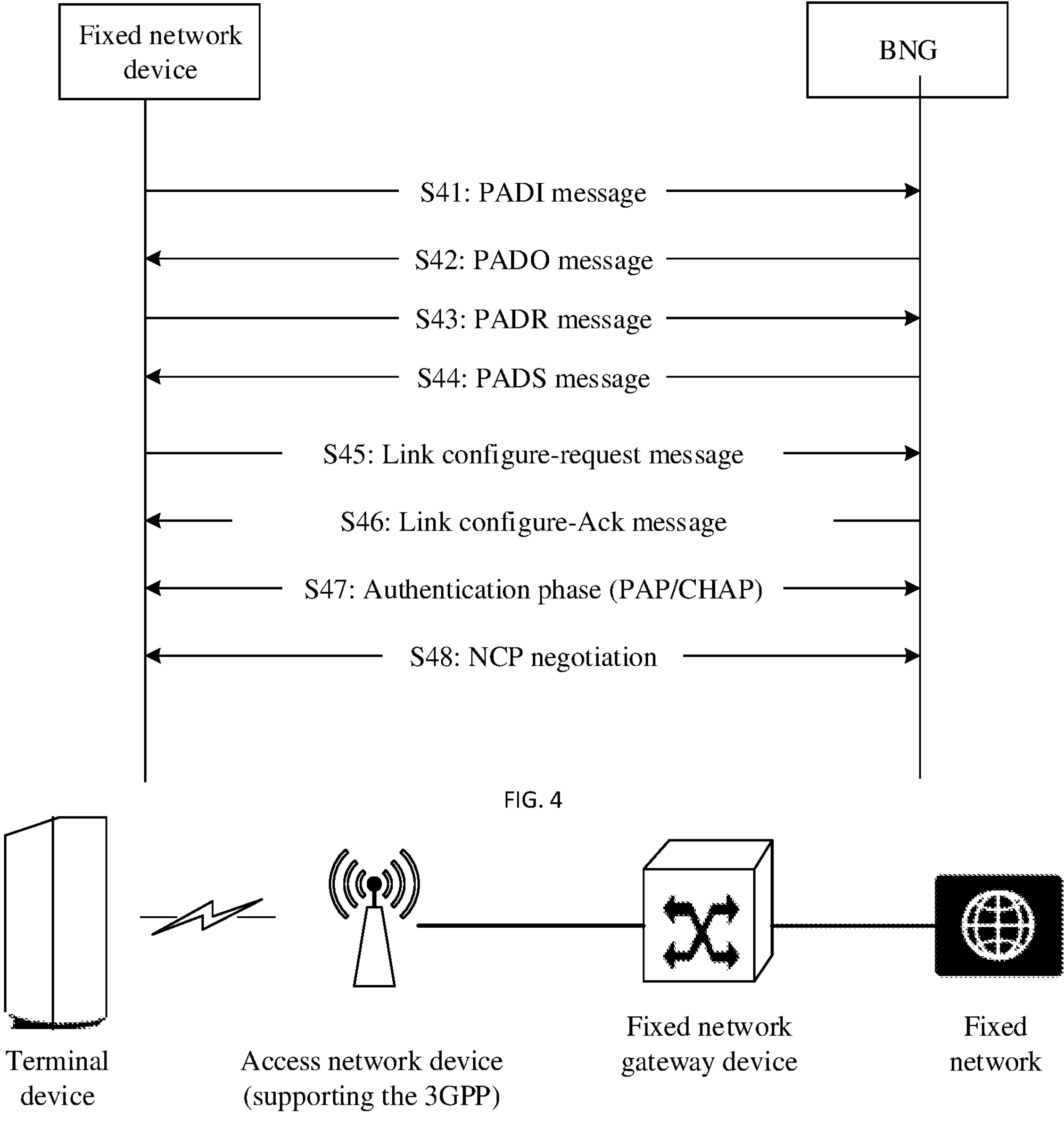
FIG. 4 is a schematic diagram of a PPPoE communication procedure.
FIG. 5 is a schematic diagram of an architecture of a communication system according to an embodiment of this application.

FIG. 4 shows a PPPoE communication procedure, and shows a procedure of establishing a session between a PPPoE client and a PPPoE server. The PPPoE client may be the foregoing fixed network terminal, and the PPPoE server may be the foregoing BNG. That the fixed network terminal establishes a PPPoE connection to the BNG is described in FIG. 4 by using a fixed network terminal as the PPPoE client and a BNG as the PPPoE server, and the following steps are included.

S41: The fixed network terminal sends a PPPoE active discovery initiation (PADI) message to the BNG by using an access node AN. The message is sent in a broadcast manner, and the message includes a service name of a service requested by the fixed network terminal. In FIG. 4, the access node AN located between the fixed network terminal device and the BNG is omitted.

S42: After receiving the PADI message, the BNG judges whether the BNG is capable of providing the service, and if the BNG is capable of providing the service, sends a PPPoE active discovery response (PADO) message to the fixed network terminal by using the access node to respond. The PADO message includes a PPPoE server (that is, the BNG) name and a same service name in the PADI message. If the BNG cannot provide the service, the PADO message is not sent. FIG. 4 shows a case in which the BNG is capable of providing the service, that is, S42: The BNG sends the PADO message to the fixed network terminal. The AN is omitted, that is, specifically, the BNG sends the PADO message, and the AN receives the PADO message, and sends the PADO message to the fixed network terminal.

S43: Because the PADI is sent in the broadcast manner, the fixed network terminal may receive more than one PADO message. When receiving a plurality of PADO messages, the fixed network terminal may select a PPPoE server (that is, the BNG) based on the server name in the PADO or the provided service, and send a PPPoE active discovery request (PPPoE Active Discovery Request, PADR) message to the selected BNG by using the access node. The PADR message includes a service requested by the fixed network terminal.

S44: After receiving the PADR message sent by the fixed network terminal, the BNG sends a PPPoE active discovery session-configuration (PPPoE Active Discovery Session-confirmation, PADS) message as a response to the fixed network terminal by using the access node. The PADS message is used to establish a PPPoE session. For example, the BNG creates a PPPoE session identifier (Session ID) for the PPPoE session, and the PADS message includes the PPPoE session identifier. In this case, both communication parties can obtain the session identifier and a MAC address of each other, and then define the PPPoE session based on the session identifier (Session ID) and the MAC address.

Further, the fixed network terminal exchanges a link configure protocol (LCP) message with the BNG to complete configuration of a data link parameter. S45: The fixed network terminal sends a link configure-request message to the BNG; and S46: The BNG sends an LCP configure-Ack message to the fixed network terminal.

S47: The fixed network terminal and the BNG perform an authentication phase, which relates to a password authentication protocol (PAP) and a challenge handshake authentication protocol (CHAP).

S48: The fixed network terminal and the BNG perform a network side parameter negotiation (NCP negotiation) phase, and the fixed network terminal obtains the IP address in this phase.

The solution of the wireline access to a fixed network described above relates to an optical cable layout. However, for some remote areas, optical fibers cannot be laid or are difficult to lay due to environment or actual area jurisdiction restrictions, resulting in a low fiber to the home rate. Therefore, the technology of obtaining broadband services through wireline access to the fixed network is not applicable to these areas.

Based on this, embodiments of this application provide a communication method, so that an access network device supporting a 3GPP access technology is introduced to provide, in a manner of wireless access to a fixed network, a corresponding broadband service for an area in which a wire line cannot be laid. The following further describes embodiments of this application with reference to the accompanying drawings.

"A plurality of" in this application means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, it should be understood that although terms such as "first" and "second" may be used in embodiments of the present invention to describe data, the data is not limited to these terms. These terms are only used to distinguish the data from each other.

FIG. 5 shows an architecture of a communication system. The communication method provided in embodiments of this application is applied to the communication system. The communication system includes at least one terminal device, at least one access network device supporting a 3GPP access technology, and at least one fixed network gateway device. For example, FIG. 5 shows a terminal device, an access network device, and a fixed network gateway device, that is, a first fixed network gateway device.

The terminal device is also referred to as user equipment (UE), an access terminal, a terminal, a terminal apparatus, or the like. The terminal device may receive a mobile signal, and provide a wireless local area network communication capability for at least one terminal device within a coverage area of the mobile signal. The wireless local area network may be a wireless fidelity (Wi-Fi) network, Bluetooth, or the like. For example, a type of the terminal device may be the foregoing fixed network terminal, for example, a residential gateway, a home terminal, or customer-premises equipment CPE.

The access network device in embodiments of this application may also be referred to as base station device, or may be referred to as a base station, a relay station, a radio access point (RAN), or the like. For example, the access network device may be a base transceiver station (BTS) in a global system for mobile communications (GSM) or a code division multiple access (CDMA) network, or may be an NB (NodeB) in a wideband code division multiple access (WCDMA), or may be an eNB or an eNodeB (evolved NodeB) in a long term evolution (LTE) system. The access network device may alternatively be a base station device in a 5G network or a network device in a future evolved public land mobile network (PLMN). The access network device may support the 3GPP technology. It may be understood that the access network device may fully support a 3GPP protocol stack, or may support a part of the 3GPP protocol stack, for example, support only a part or all of a protocol stack in a physical layer, a MAC layer, an RLC layer, a PDCP layer, an SDAP layer, and an RRC layer.

The fixed network gateway device in embodiments of this application may be a broadband network gateway BNG or another gateway device. Optionally, the access network device may be deployed by a mobile operator, and a fixed network operator to which the fixed network gateway device belongs may rent the access network device by signing a contract with the mobile operator. In this scenario, the access network device may serve both a terminal device of the mobile operator and a fixed network terminal of the fixed network operator that signs the contract with the mobile operator. Alternatively, optionally, the access network device may be independently deployed by the fixed network operator. In this scenario, the access network device may serve only the fixed network terminal of the fixed network operator.

The terminal device establishes a secure air interface connection to the access network device through authorization and/or authentication, and accesses a fixed network in a wireless manner by using the access network device, to implement data transmission and obtain a related fixed network service. The authorization may be that the network and the terminal device authorize, according to a pre-configured security solution, whether each other is a trusted device or network. The authentication may be that the terminal device is determined whether the terminal device is allowed to obtain a service (for example, a home broadband service), and an identifier, a user name, or a password of the terminal device is authenticated. A terminal device accesses a network by using the 3GPP access technology. Compared with a conventional manner of wireline access to a fixed network, the 3GPP access manner can simplify deployment, enhance coverage, and improve performance of a communication system.

The following describes in detail a solution in which a terminal device accesses, by using a 3GPP access technology, a fixed network by using an access network device.

First, a network selection process before the terminal device accesses the fixed network is described.

Figure 6:
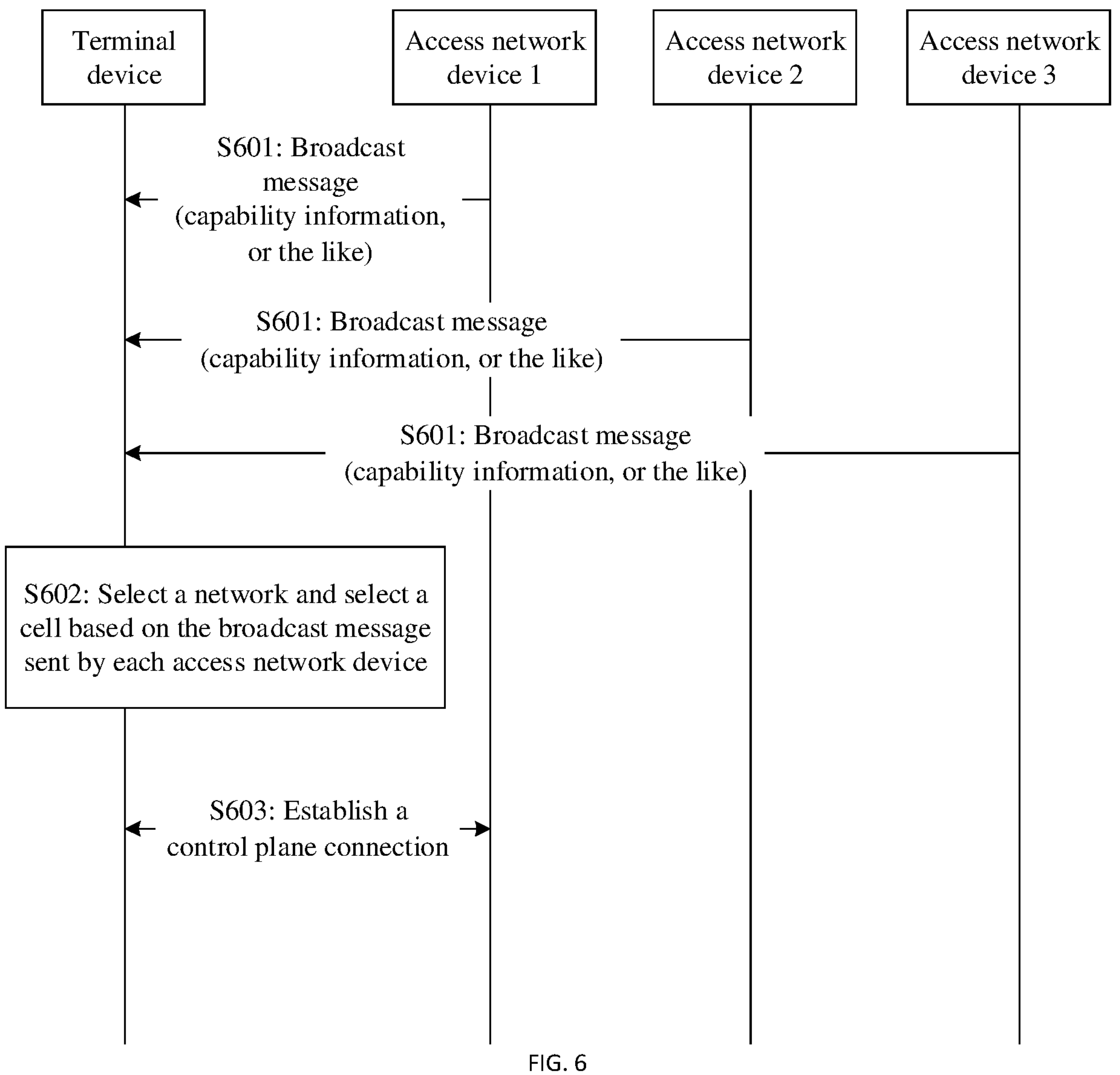
FIG. 6 is a schematic flowchart of a network selection method according to an embodiment of this application.

FIG. 6 is a schematic flowchart of a network selection method. The network selection method mainly includes the following procedure.

S601: A terminal device receives a message sent by at least one access network device, where a message sent by each access network device includes capability information of the access network device and/or identification information indicating a fixed network supported by the access network device. Optionally, the message may be sent in a broadcast manner.

The capability information indicates whether the access network device supports fixed network transmission, or indicates whether the access network device supports data transmission of a fixed network terminal such as a residential gateway. The identification information may be a fixed network identifier and/or a fixed network service provider identifier. One access network device may support one or more fixed networks, and each fixed network may include (or be referred to as, correspond to) at least one fixed network gateway device. For example, when the access network device supports one fixed network, the access network device may be connected to at least one fixed network gateway device in the fixed network. For another example, when the access network device supports a plurality of fixed networks, the access network device may be connected to at least one fixed network gateway device in each fixed network.

In addition, optionally, the message may further include network priority information, where the network priority information indicates a priority of a mobile operator to which the access network device belongs. The mobile operator can provide a mobile network capability. Specifically, in the foregoing scenario: The access network device may be deployed by the mobile operator, and a fixed network operator to which the fixed network gateway device belongs may rent the access network device by signing a contract with the mobile operator. That is, the access network device serves both a terminal of the mobile operator and a terminal (that is, a fixed network terminal) of the fixed network operator. A fixed network operator may sign contracts with a plurality of mobile operators. Therefore, access network devices of different mobile operators that can provide fixed network transmission capabilities may exist in an area in which the terminal device is located. In this case, the network priority information may indicate a priority of a network of each mobile operator, so that the terminal device selects, based on the network priority information, a proper network, and selects a cell that can provide a fixed network transmission capability.

For example, FIG. 6 shows three access network devices: an access network device 1, an access network device 2, and an access network device 3. S601 in FIG. 6 specifically shows that the terminal device receives broadcast messages sent by the access network device 1, the access network device 2, and the access network device 3.

S602: The terminal device selects a network and selects a cell based on the message sent by each access network device.

Specifically, the terminal device may select the network (selecting the network is referred to as network selection for short) and select the cell based on at least one of the following information: the capability information of each access network device, the fixed network identifier, information of a fixed network service provider identifier, and the network priority information. For example, the terminal device may select an access network device supporting fixed network transmission, and the terminal device may select a fixed network from fixed networks corresponding to one or more fixed network gateway devices supported by the access network device supporting fixed network transmission, for example, select a fixed network corresponding to a first fixed network gateway device.

S603: If the terminal device selects the access network device 1 in S602, the terminal device may establish a control plane connection to the access network device 1, or the terminal device may establish a radio resource control (RRC) signaling connection to the access network device 1.

Specifically, the terminal device may send a connection request to the access network device 1, where the connection request is used to request to establish the control plane connection; and the access network device establishes the control plane connection to the terminal device.

In an optional implementation, before receiving the connection request from the terminal device, the access network device may interact with the terminal device. Through the interaction process, the access network device may implicitly determine, based on an interactive message between the access network device and the terminal device, that a type of the terminal device is a target type and/or the terminal device is allowed to obtain a service by using the fixed network gateway device. For example, the access network device sends, to the terminal device, the capability information of the access network device and/or the identification information indicating the fixed network supported by the access network device. Based on an interaction procedure between the access network device and the terminal device, when receiving the connection request, the access network device may implicitly determine that the terminal device needs to obtain the service by using the fixed network gateway device supported by the access network device. Alternatively, it may be understood that the terminal device indirectly (or implicitly) reports, to the network device by using the connection request, that the terminal device needs to obtain the service by using the fixed network gateway device supported by the access network device. In addition, the access network device may further determine the type of the terminal device based on a format, a protocol, or the like of an interactive message between the terminal device and the access network device. In another optional implementation, the terminal device may report, by using the connection request including information indicating the type of the terminal device is the target type, the type of the terminal device to the access network device in a direct (or an explicit) manner. The target type includes one or more of a residential gateway, a home terminal, and customer-premises equipment, and may further include a mobile phone, an AR terminal/a VR terminal, a Pad, and another type of terminal. This is not limited in this embodiment of this application.

Figure 7:
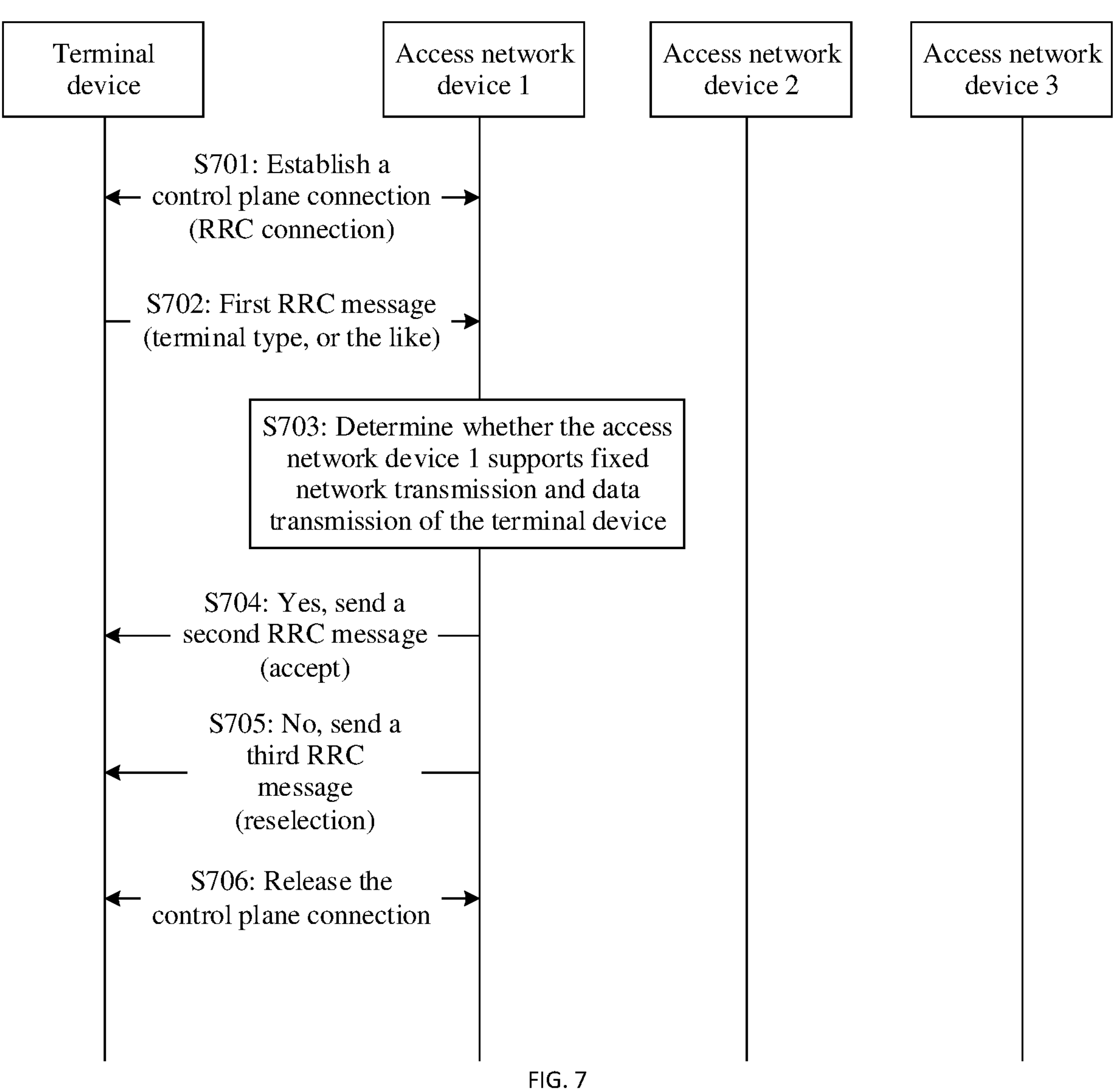
FIG. 7 is a schematic flowchart of another network selection method according to an embodiment of this application.

FIG. 7 is a schematic flowchart of another network selection method. The network selection method mainly includes the following procedure.

S701: A terminal device selects one of at least one access network device, and establishes a control plane connection to the access network device.

Optionally, the terminal device may receive network information sent by at least one access network device, and select a network based on configuration information. The network information may be sent in a broadcast manner. The terminal device may further select an accessible cell based on a requirement such as cell signal quality, and establish the control plane connection to the access network device corresponding to the selected network. For example, FIG. 7 shows three access network devices: an access network device 1, an access network device 2, and an access network device 3. The terminal device selects the access network device 1, and establishes a control plane connection (an RRC connection) to the access network device 1.

S702: The terminal device sends a first RRC message to the access network device 1.

The first RRC message includes at least one of the following information: information indicating that a type of the terminal device is a target type, and identification information of a fixed network that the terminal device requests to access. The target type includes one or more of a residential gateway, a home terminal, and customer-premises equipment, and may further include a mobile phone, an AR terminal/a VR terminal, a Pad, and another type of terminal. This is not limited in this embodiment of this application. The identification information of the fixed network may include a fixed network identifier and/or a service provider identifier. Optionally, the type of the terminal device that needs to access the fixed network may be agreed on. The first RRC message includes only the identification information of the fixed network that the terminal device requests to access, the access network device 1 may also determine the type of the terminal device based on the first RRC message. In other words, in this case, the terminal device indirectly (or implicitly) reports the type of the terminal device to the access network device 1 by using the first RRC message. Alternatively, optionally, different types of terminal devices may be configured to exchange different message formats with the network device, for example, different signaling sizes. In this design, the network device may determine the type of the terminal device based on interaction between the terminal device and the network device.

S703: The access network device 1 determines whether fixed network transmission and data transmission requested by the terminal device is supported.

When learning, based on the first RRC message, that the terminal device is a fixed network terminal such as a residential gateway, a client terminal, or a home terminal, and determining that fixed network transmission can be supported, the access network device 1 may determine, based on the fixed network identifier/fixed network service provider identifier, whether the data transmission requested by the terminal device can be supported.

If yes, perform S704: The access network device 1 sends a second RRC message to the terminal device, where the second RRC message indicates that data transmission of the terminal device is accepted or supported. When determining that the data transmission of the terminal device can be supported, the access network device 1 may not send the RRC message, to indicate that the access network device 1 accepts or supports the data transmission of the terminal device by default, and maintains the control plane connection.

Otherwise, S705 and S706 are performed. S705: The access network device 1 sends a third RRC message to the terminal device, where the third RRC message includes information indicating the terminal device to perform network reselection and/or cell reselection. S706: The access network device 1 and the terminal device release the control plane connection (or referred to as the RRC connection). Therefore, when the access network device 1 does not support data transmission of the terminal device, a procedure of selecting a network needs to be re-performed until a proper network and cell that support data transmission of the terminal device are selected for the terminal device.

Then, with reference to the following Solution 1 and Solution 2, a process in which the terminal device accesses the fixed network to perform data transmission is described in detail.

Figure 8:
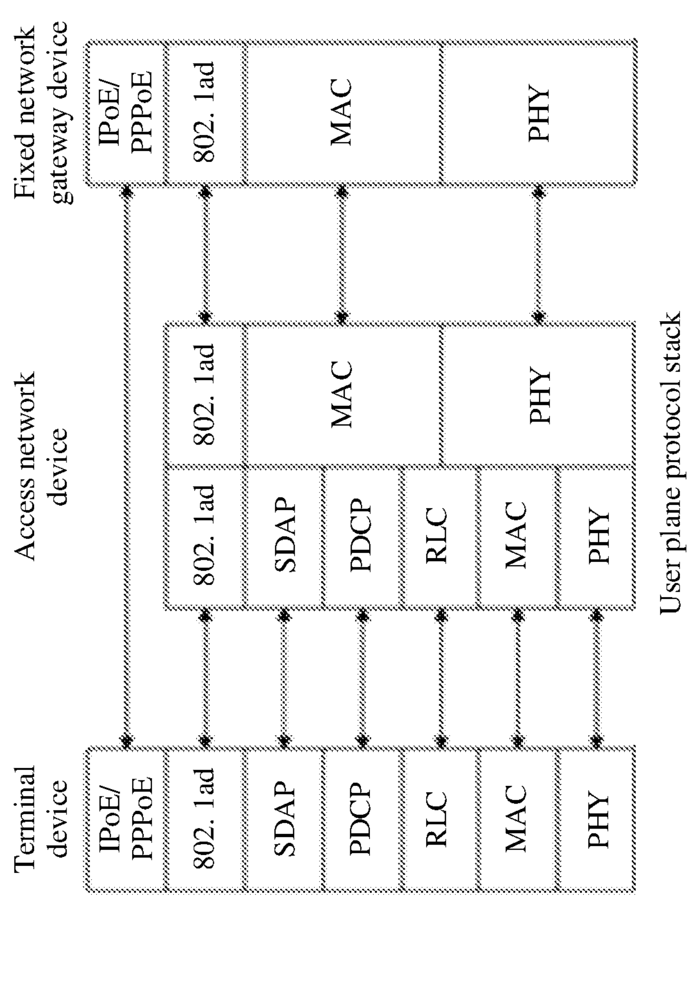
FIG. 8 is a schematic diagram of an architecture of a protocol stack according to an embodiment of this application.

Solution 1:

As shown in FIG. 8, an embodiment of this application provides a protocol stack architecture, and specifically shows a control plane protocol stack and a user plane protocol stack. In an optional implementation, the protocol stack architecture may be constructed by implementing Solution 1, or it may be understood that the protocol stack architecture is used in Solution 1. In addition, it should be noted that the protocol stack shown in FIG. 8 is only used as a possible implementation, and another protocol stack architecture is also applied to Solution 1. This is not limited in this embodiment of this application.

A control plane protocol stack on each of a terminal device side and an access network device side is divided into an RRC layer, a packet data convergence protocol (PDCP) layer, a radio link control protocol (RLC) layer, a medium access control (MAC) layer, and a physical (PHY) layer. A user plane protocol stack on a terminal device side is divided into an IPoE/a PPPoE protocol layer, an 802.1ad protocol layer, a service data adaptation protocol (SDAP) layer, a PDCP layer, an RLC layer, a MAC layer, and a PHY layer. A user plane protocol stack on an access network device side that communicates with a terminal device is divided into an 802.1ad protocol layer, an SDAP layer, a PDCP layer, an RLC layer, a MAC layer, and a PHY layer. A user plane protocol stack on the access network device side that communicates with a fixed network gateway device is divided into an 802.1ad protocol layer, a MAC layer, and a PHY layer. A user plane protocol stack on a fixed network gateway device side is divided into an IPoE/a PPPoE protocol layer, an 802.1ad protocol layer, a MAC layer, and a PHY layer.

An access network device supports a 3GPP access technology, and the terminal device may perform transmission with the access network device by using the 3GPP technology (or referred to as a cellular air interface). For example, the terminal device may establish a control plane connection to the access network device, and a control plane message may be transmitted by using RRC signaling. The terminal device may establish a user plane connection to the access network device, and a user plane message may be transmitted through the user plane connection. The access network device, as a switch, performs data transmission to a fixed network gateway device in a wireline manner. In this case, the terminal device may establish a connection to the fixed network gateway device by using the access network device, that is, as shown in FIG. 8, the terminal device communicates with the fixed network gateway device according to a PPPoE or an IPoE protocol. The access network device performs a forwarding function, and can forward data from the terminal device to the fixed network gateway device, and can also forward data from the fixed network gateway device to the terminal device. The access network device may also be understood as a bridge between the terminal device and the fixed network gateway device. In addition, it should be noted that, because the terminal device does not need to interact with a core network, the terminal device in Solution 1 does not need to support a protocol layer related to the core network, for example, a non-access stratum (non-access stratum, NAS). The access network device may fully support a 3GPP protocol stack, or may support a part of a 3GPP protocol stack. For example, the access network device may support a part or all of a protocol stack in a PHY layer, a MAC layer, an RLC layer, a PDCP layer, an SDAP layer, and an RRC layer.

The following describes in detail different implementations of performing authorization and/or authentication on the terminal device in a network access process.

Manner 1: The access network device obtains information used for authorization and authentication on the terminal device, and performs authorization and authentication on the terminal device.

Figure 9A:
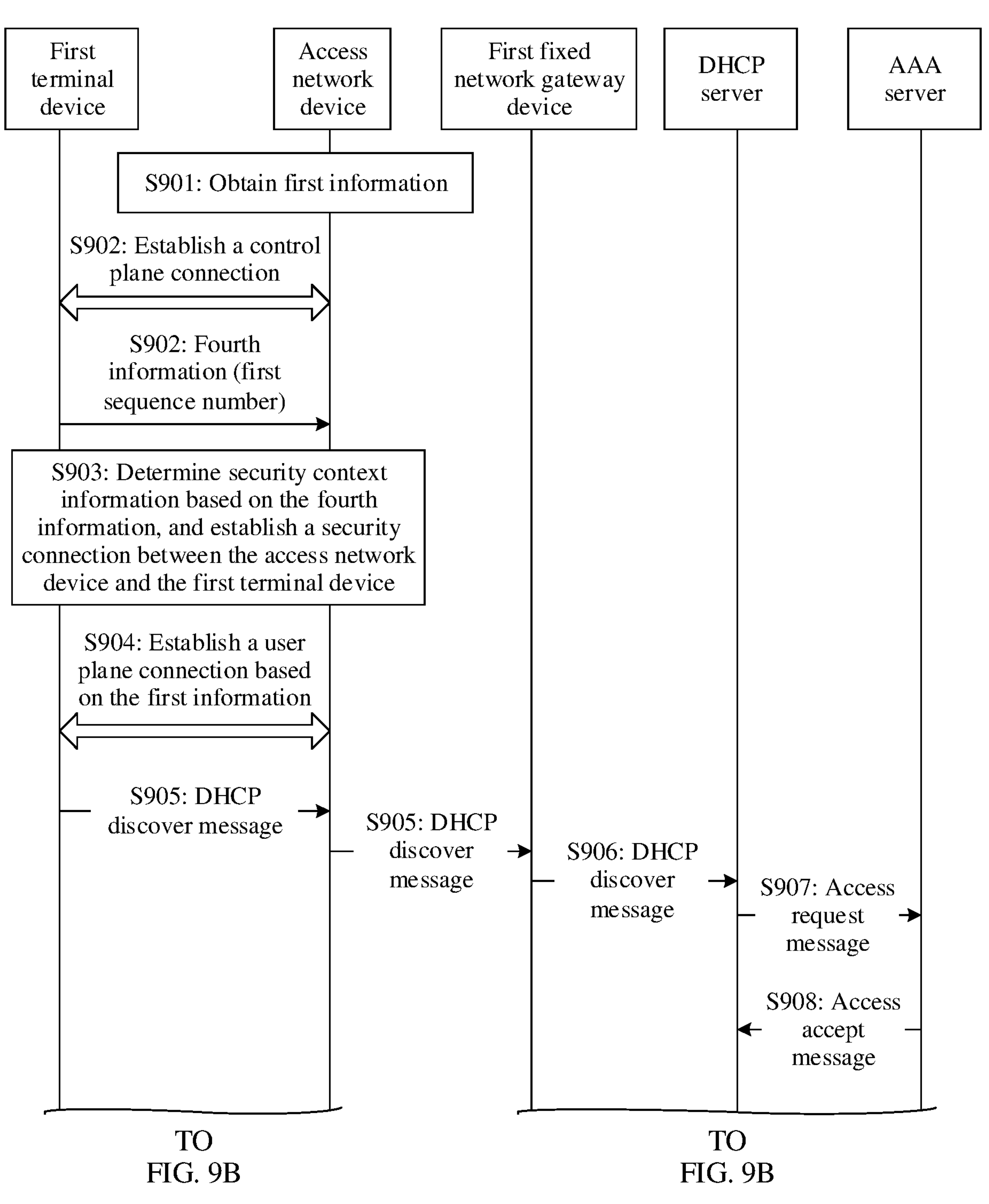
FIG. 9A and FIG. 9B are a schematic flowchart of a communication method according to an embodiment of this application.
Figure 9B:
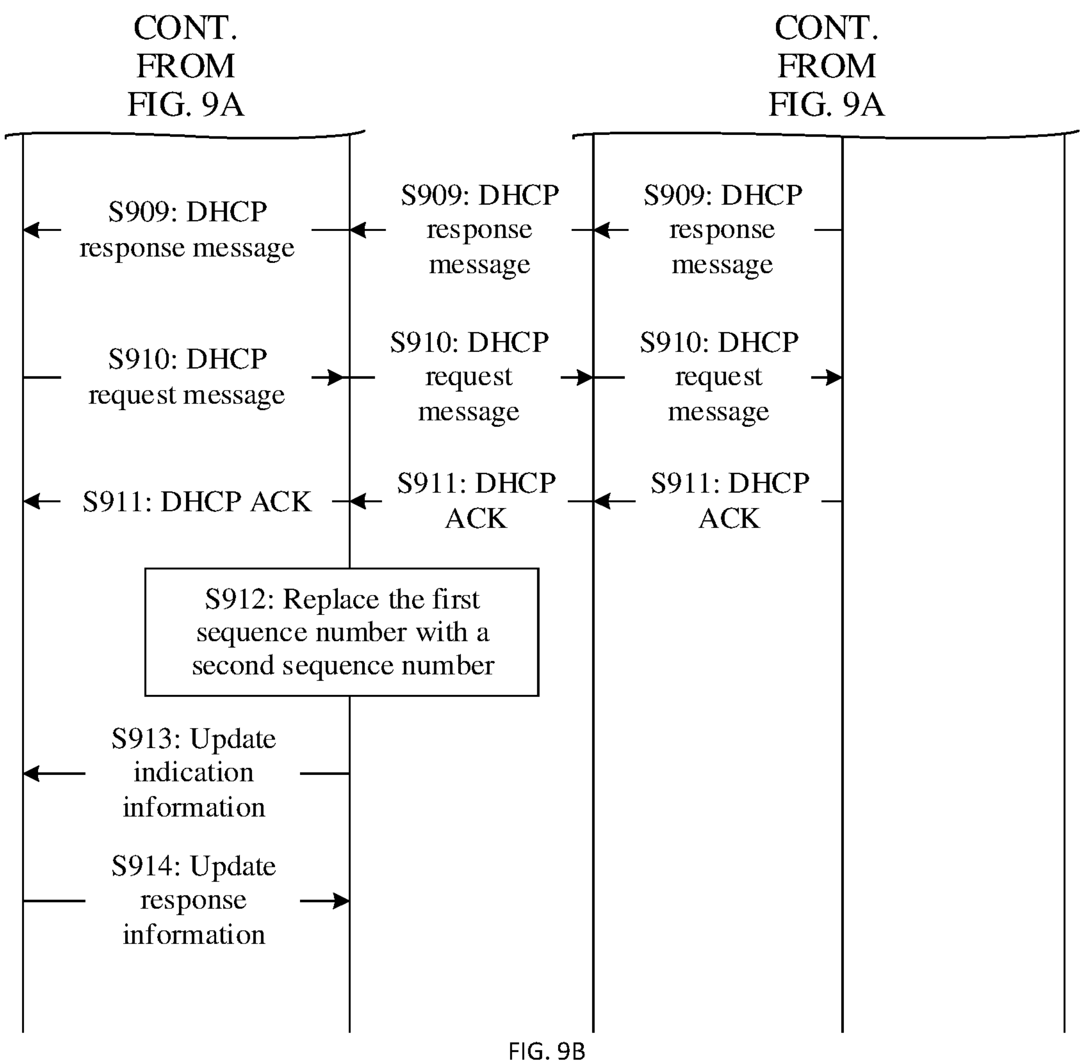

FIG. 9A and FIG. 9B show a communication method. The method mainly includes the following procedure.

S901: An access network device obtains first information, where the access network device supports a 3GPP access technology. That the access network device supports the 3GPP access technology may include that the access network device supports air interface transmission of a wireless network such as 4G/5G.

The first information may be information pre-configured in the access network device, or the first information is obtained from at least one fixed network gateway device connected to the access network device. The first information includes subscription data information corresponding to at least one terminal device, where the subscription data information is used to determine that the terminal device is allowed to obtain a service by using the fixed network gateway device, or the subscription data information is used to determine that the terminal device is not allowed to obtain a fixed network service by using the fixed network gateway device. The subscription data information may include one or more pieces of fixed network service information, quality of service (QoS) information, and priority information. The QoS information and/or the priority information may be used as a basis for subsequently configuring a user plane resource by the terminal device.

In addition, the first information may further include security context information of the at least one terminal device and an identifier set. The security context information is used to establish a security connection between the access network device and the terminal device. The security context information may specifically include one or more pieces of information used to establish the security connection, such as a root key, a public key, a private key, and a certificate. The establishment of the security connection may include a procedure such as an authentication procedure or a key agreement procedure. The identifier set may include a first sequence set and a second sequence set. It may be understood that the first sequence set includes at least one sequence number currently used to indicate the security context information of the terminal device, and the second sequence set includes a plurality of sequence numbers currently not used to indicate the security context information of the terminal device. Sequence numbers in the first sequence set/second sequence set may dynamically change. For example, after an authentication procedure is completed, a sequence number may be selected from the second sequence set, for example, denoted as a sequence number A; and a sequence number (for example, denoted as a sequence number B) currently corresponding to security context information in the authentication procedure is replaced with the foregoing selected sequence number A. That is, the selected sequence number A is incorporated into the first sequence set, and the original sequence number B in the first sequence set is removed. Optionally, the sequence number B may be incorporated into the second sequence set for subsequent use.

S902: The access network device obtains fourth information from a first terminal device, where the fourth information is used to determine security context information of the first terminal device.

The first terminal device may be any one of the at least one terminal device mentioned in S901. Optionally, the fourth information includes a first sequence number corresponding to the security context information of the first terminal device. Optionally, the first sequence number may be a terminal identifier or a security context identifier corresponding to the first terminal device.

The fourth information may further include identification information of a fixed network corresponding to a fixed network gateway device supported by the first terminal device, and the identification information of the fixed network may include a fixed network identifier and/or a fixed network service provider identifier. For example, the fixed network gateway device supported by the first terminal device is a first fixed network gateway device, that is, the first fixed network gateway device may provide a fixed network service for the first terminal device, and the fourth information includes identification information of a fixed network corresponding to the first fixed network gateway device. The first fixed network gateway device may be included in the at least one fixed network gateway device connected to the access network device.

Before the access network device obtains the fourth information, the first terminal device may further complete network selection according to any one of the foregoing two network selection methods. It may be understood that the first terminal device selects the access network device described in S902, and the first terminal device establishes a control plane connection to the access network device. In this case, the access network device may receive, through the control plane connection between the access network device and the first terminal device, the fourth information sent by the first terminal device.

For example, the following process is shown in S902 in FIG. 9A and FIG. 9B: The first terminal device completes the network selection, and establishes the control plane connection to the access network device, and the access network device receives the fourth information from the first terminal device through the control plane connection.

S903: The access network device establishes a security connection between the access network device and the first terminal device based on the fourth information.

The access network device may obtain the security context information of the at least one terminal device and the identifier set. For example, the access network device may obtain, based on the first information described in S901, the security context information of the at least one terminal device and the identifier set from the first information. Then, the access network device determines that a first sequence number set in the identifier set includes the first sequence number, and the access network device may obtain, based on the first sequence number, the security context information of the first terminal device from the security context information of the at least one terminal device, and establish the security connection between the access network device and the first terminal device by using the security context information of the first terminal device. For example, the access network device may perform mutual authentication with the first terminal device based on the security context information corresponding to the first sequence number, to determine that both the access network device and the first terminal device are trusted devices for each other.

After the security connection between the access network device and the first terminal device is established, the access network device may further replace the first sequence number with a second sequence number in a second sequence number set, and send the second sequence number to the first terminal device, where the second sequence number is used to indicate the security context information of the first terminal device. Alternatively, it may be understood that after the security connection between the access network device and the first terminal device is established, a sequence number that is stored in the first terminal device and that is used to indicate the security context information of the first terminal device is updated from the original first sequence number to the second sequence number. In addition, it should be noted that an implementation time period (or referred to as an implementation phase) of replacing the first sequence number with the second sequence number may be performed immediately after S903, for example, after S903 and before S904, the first sequence number is replaced with the second sequence number; or the first sequence number may be replaced with the second sequence number after the first terminal device accesses the fixed network. In this embodiment of this application, a specific implementation time period of an operation of replacing the first sequence number with the second sequence number is not limited. For example, S912 to S914 after S911 in FIG. 9A and FIG. 9B show the operation of replacing the first sequence number with the second sequence number.

S904: The access network device establishes a user plane connection to the first terminal device based on the first information.

Specifically, the access network device determines, based on the subscription data information corresponding to the first terminal device, whether the first terminal device is allowed to obtain a service by using the first fixed network gateway device. If it is determined that the first terminal device is allowed to obtain the service by using the first fixed network gateway device, the access network device establishes, based on the fixed network service information, the priority information, the QoS information, and the like in the subscription data information corresponding to the first terminal device, the user plane connection to the first terminal device, that is, establishes a user plane resource such as a data radio bearer (data radio bearer, DRB), and continues to perform a procedure after S904. If it is determined that the first terminal device is not allowed to obtain the fixed network service by using the first fixed network gateway device, the procedure after S904 may not be performed, or the procedure after S904 may be performed.

In addition, for a case in which the first terminal device is allowed to obtain the service by using the first fixed network gateway device, it may be understood as that the first terminal device has permission to obtain the service, and the first terminal device is capable of obtaining the service by using the first fixed network gateway device; or in other words, the first terminal device enables the service that needs to be obtained by using the first fixed network gateway device. For a case in which the first terminal device is not allowed to obtain the service by using the first fixed network gateway device, it may be understood as that the first terminal device does not have permission to obtain the service, or the first terminal device is not capable of obtaining the service by using the first fixed network gateway device; or in other words, the first terminal device disables the service that needs to be obtained by using the first fixed network gateway device.

S905: The access network device sends second information to the first fixed network gateway device, where the second information is used to request to manage a connection between the first terminal device and the first fixed network gateway device. The management includes establishment, modification, release, deletion, or the like. In an optional implementation, if the first terminal device needs to communicate with the first fixed network gateway device through an IPoE protocol, the access network device may obtain a DHCP discover (DHCP discover) message from the first terminal device. If it is determined that the first terminal device is allowed to obtain the service by using the first fixed network gateway device, the access network device adds an accessible identifier to the DHCP discover message sent by the first terminal device, where the accessible identifier indicates that the first terminal device is allowed to obtain the service by using the first fixed network gateway device. If it is determined that the first terminal device does not support the fixed network service provided by the first fixed network gateway device, the access network device adds a non-accessible identifier to the DHCP discover message sent by the first terminal device, where the non-accessible identifier indicates that the first terminal device is not allowed to obtain the service by using the first fixed network gateway device. Optionally, the first terminal device may send the DHCP discover message to the access network device through the control plane connection between the first terminal device and the access network device; or the first terminal device may send the DHCP discover message to the access network device via the user plane connection between the first terminal device and the access network device. This is not limited herein.

In another optional implementation, if the first terminal device needs to communicate with the first fixed network gateway device through a PPPoE protocol, the access network device may obtain a PPPoE active discovery initiation (PADI) message from the first terminal device, and if it is determined that the first terminal device is allowed to obtain the service by using the first fixed network gateway device, the access network device adds an accessible identifier to the PADI message sent by the first terminal device, where the accessible identifier indicates that the first terminal device is allowed to obtain the service by using the first fixed network gateway device. If it is determined that the first terminal device is not allowed to obtain the service by using the first fixed network gateway device, the access network device adds a non-accessible identifier to the PADI message sent by the first terminal device, where the non-accessible identifier indicates that the first terminal device is not allowed to obtain the service by using the first fixed network gateway device. Optionally, the first terminal device may further send the PADI message to the access network device through the control plane connection between the first terminal device and the access network device; or the first terminal device may send the PADI message to the access network device via the user plane connection between the first terminal device and the access network device. For the accessible identifier and the non-accessible identifier, in an optional implementation, the first information obtained by the access network device in S901 may further include an accessible identifier set and a non-accessible identifier set. The access network device may select an accessible identifier from the accessible identifier set, and add the accessible identifier to the DHCP discover message or the PADI message, to generate the second information. It may be understood that the second information means a DHCP discover message added with the accessible identifier or a PADI message added with the accessible identifier. For example, the accessible identifier or the non-accessible identifier may be specifically represented by using a Line ID. For example, the accessible identifier set may include one or more accessible Line IDs, and the non-accessible identifier set may include one or more non-accessible Line IDs. That is, the Line ID in this manner 1 is used to indicate whether the terminal device supports the fixed network service supported by the fixed network gateway device. In another optional implementation, values of the accessible identifier and the non-accessible identifier are different. For example, a value of the accessible identifier is "1", and a value of the non-accessible identifier is "0"; or a value of the accessible identifier is "0", and a value of the non-accessible identifier is "1".

For example, FIG. 9A and FIG. 9B show that the first terminal device needs to communicate with the first fixed network gateway device by using the IPoE protocol, and S905 includes: The first terminal device sends the DHCP discover message to the access network device; the access network device adds the accessible identifier to the DHCP discover message sent by the first terminal device, that is, generates the second information; and the access network device sends, to the first fixed network gateway device, a DHCP discover message to which the accessible identifier is added.

S906: The first fixed network gateway device sends the received DHCP discover message to a DHCP server.

S907: The DHCP server sends an access request message to an AAA server, where the access request message includes the accessible identifier or the non-accessible identifier in the DHCP discover message, so that the AAA server determines, based on the accessible identifier or the non-accessible identifier, whether the first terminal device is capable of accessing the fixed network corresponding to the first fixed network gateway, or may be understood as: The AAA server further attempts to authenticate, based on the accessible identifier or the non-accessible identifier, the first terminal device based on the authorization or authentication performed by the access network device, and determines whether the first terminal device can be authenticated.

S908: If the AAA server obtains the accessible identifier, the AAA server may send an access accept message to the DHCP server; or if the AAA server obtains the non-accessible identifier, the AAA server may send an access deny message to the DHCP server.

For example, FIG. 9A and FIG. 9B show a case in which the AAA server sends the access accept message to the DHCP server.

S909: If the DHCP server receives the access accept message, the DHCP server may send a DHCP response (DHCP offer) message to the first terminal device by using the first fixed network gateway device and the access network device; or if the DHCP server receives the access deny message, the DHCP server may send a DHCP NACK message to the first terminal device by using the first fixed network gateway device and the access network device.

It may be understood that the DHCP server may send the DHCP response (DHCP offer) message to the first terminal device by using the first fixed network gateway device and the access network device.

For example, FIG. 9A and FIG. 9B show a case in which the DHCP server sends the DHCP response message to the first terminal device by using the first fixed network gateway device and the access network device. Specifically, the DHCP server sends the DHCP response message to the first fixed network gateway device, the first fixed network gateway device forwards the DHCP response message to the access network device, and the access network device forwards the DHCP response message to the first terminal device.

S910: The first terminal device may send a DHCP request message to the DHCP server by using the access network device and the first fixed network gateway device.

S911: The DHCP server may send a DHCP ACK message to the first terminal device by using the first fixed network gateway device and the access network device, where the DHCP ACK message indicates that the connection between the first terminal device and the first fixed network gateway device is successfully established. Specifically, the DHCP server sends the DHCP ACK message to the first fixed network gateway device, the first fixed network gateway device forwards the DHCP ACK message to the access network device, and the access network device forwards the DHCP ACK message to the first terminal device. If the access network device receives the DHCP ACK message, it may be determined that the connection between the first terminal device and the first fixed network gateway device is successfully established. If the access network device does not receive the DHCP ACK message, it may be considered that the connection between the first terminal device and the first fixed network gateway device is not successfully established. S912: The access network device replaces the first sequence number with the second sequence number in the second sequence number set.

S913: The access network device sends update indication information to the first terminal device, where the update indication information indicates the first terminal device to update a sequence number corresponding to the security context information of the first terminal device. The update indication information may include the second sequence number. Further, the update indication information may further include the identification information of the fixed network corresponding to the fixed network gateway device supported by the first terminal device mentioned in S902. In addition, the update indication information may also be understood as indicating the first terminal device to update the fourth information.

S914: The first terminal device sends update response information to the access network device in response to the update indication information, where the update response information indicates that the first terminal device successfully receives the update indication information.

In addition, it should be noted that, if the first terminal device needs to communicate with the first fixed network gateway device by using the PPPoE protocol, the DHCP discover message sent by the first terminal device in S906 may be replaced with the PADI message. Subsequent S907 to S911 may also be correspondingly adjusted based on a PPPoE communication procedure, for example, S42 to S48. Details are not described in this embodiment of this application. A part or all of a procedure S901 to S911 in the foregoing manner 1 may be selectively performed based on an actual requirement. In other words, it should be understood that a part of the procedure S901 to S911 may be considered as an optional procedure, and may be performed or not performed. This is not limited in this embodiment of this application. For example, in some scenarios in which there is no need to perform authentication on the terminal device, S904 may be performed after S901 is performed, and S902 and S903 are not performed, or S902 to S904 are omitted. An execution sequence of the procedure S901 to S914 is not limited in this embodiment of this application. An execution sequence of a part of the procedure may be adjusted based on an actual situation, or a part of the procedure may be performed in parallel.

Figure 10:
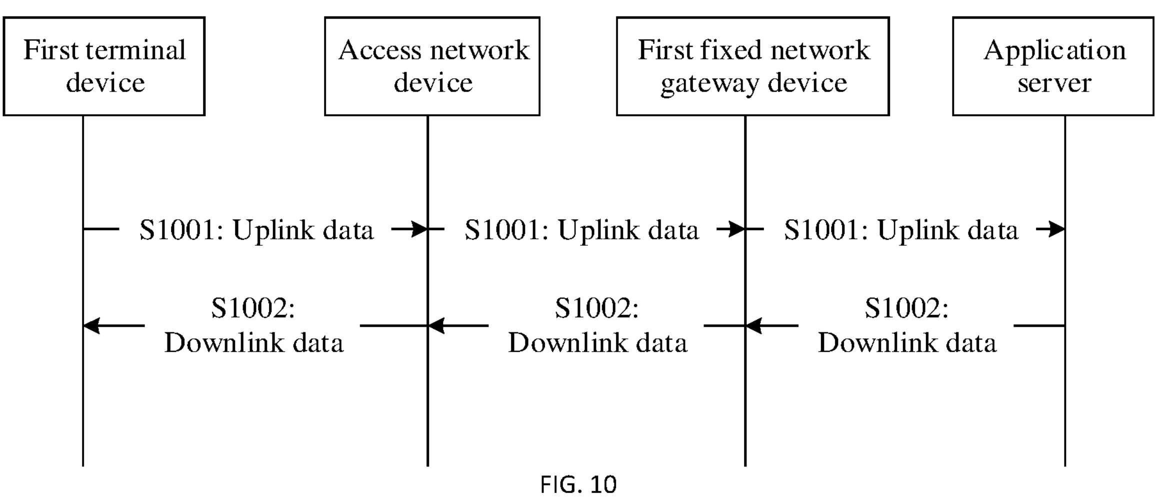
FIG. 10 is a schematic diagram of a data transmission procedure according to an embodiment of this application.

Further, as shown in FIG. 10, data transmission of the first terminal device may be implemented with reference to the following manner:

S1001: The first terminal device sends user plane data to an access network device through a user plane connection, the access network device sends the user plane data from the first terminal device to a first fixed network gateway device, and the first fixed network gateway device then sends the user plane data to an application server. The user plane data sent by the first terminal device may also be understood as uplink data. The user plane data sent by the first terminal device may be user plane data of the first terminal device, or may be user plane data of another terminal device that is within a coverage area of the first terminal device and that uses a wireless local area network communication capability provided by the first terminal device.

S1002: The application server sends the user plane data of the first terminal device to a first fixed network gateway device, the first fixed network gateway device sends the user plane data received from the application server to the access network device, and the access network device sends the user plane data from the first fixed network device to the first terminal device via the user plane connection. The user plane data from the application server may also be understood as downlink data.

It should be noted that an execution sequence of S1001 and S1002 is not limited in this embodiment of this application. S1001 may be performed before S1002, or S1002 may be performed before S1001.

Manner 1 provided in this embodiment of this application can simplify an access procedure of the terminal device, reduce signaling overheads, and reduce costs. In addition, performing authorization and authentication on the terminal device can ensure establishment of secure transmission.

Figure 11A:
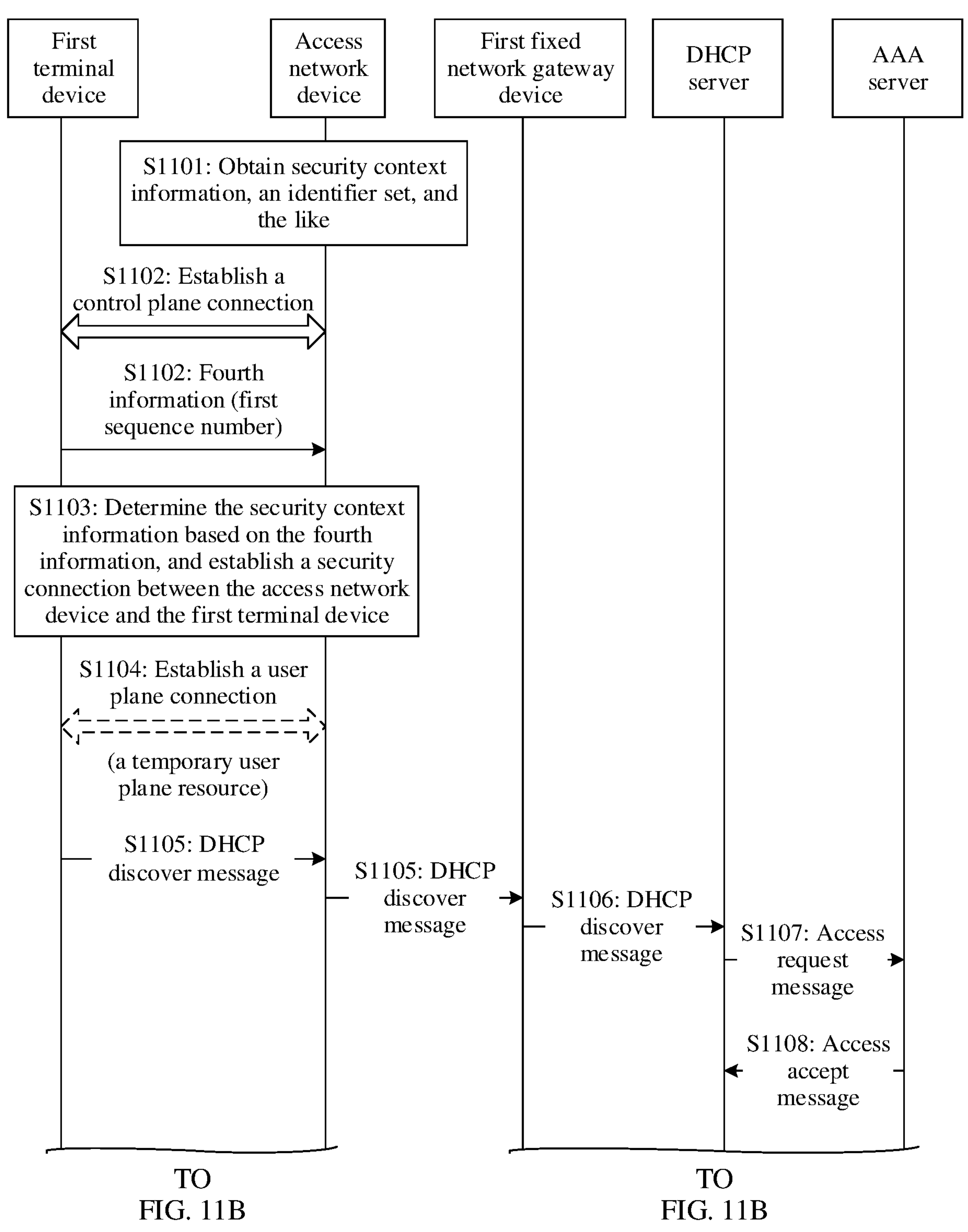
FIG. 11A and FIG. 11B are a schematic flowchart of a communication method according to an embodiment of this application.
Figure 11B:
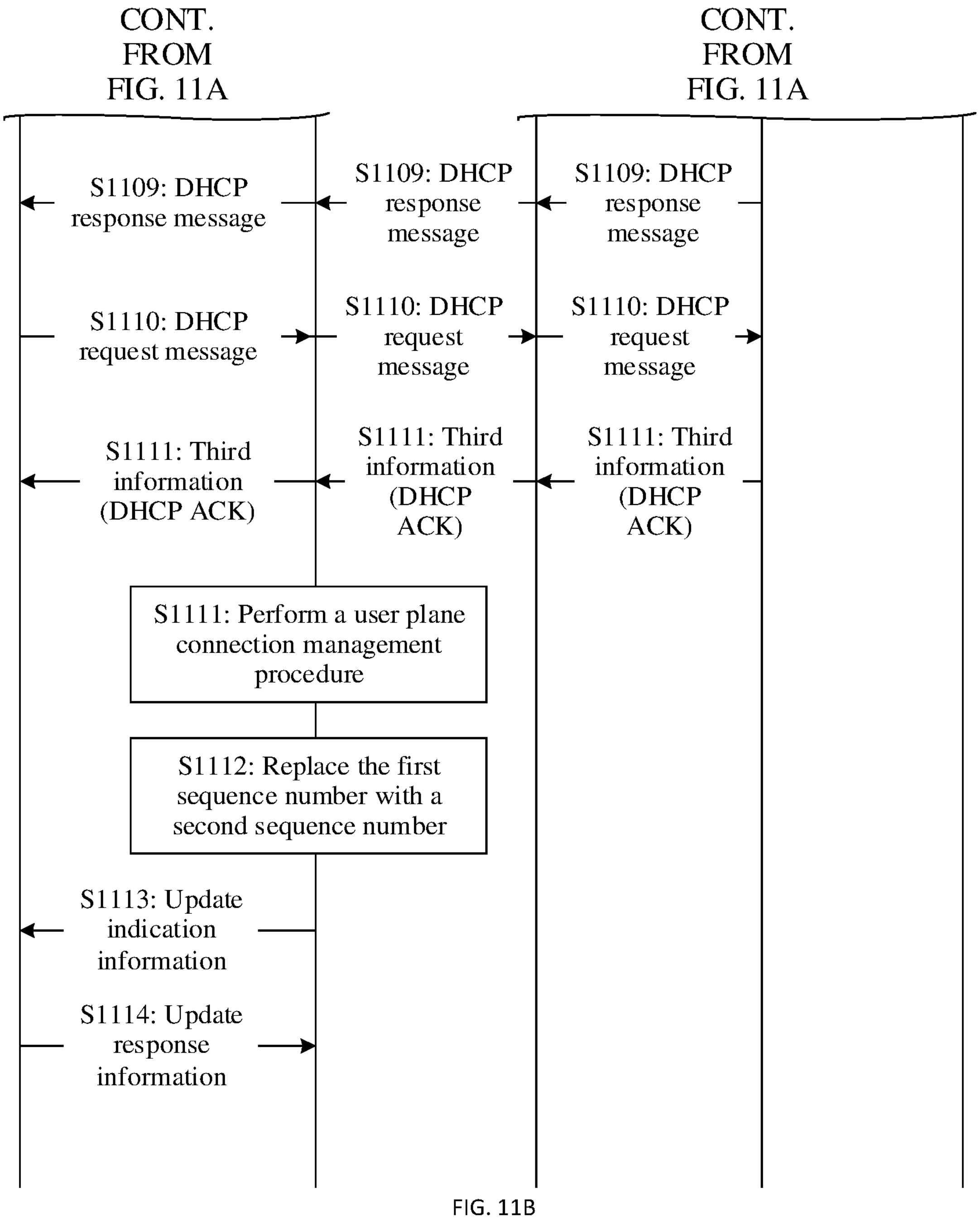

Manner 2: The access network device performs authentication on the terminal device based on information used for authentication on the terminal device, and the fixed network gateway device performs authentication on the terminal device. FIG. 11A and FIG. 11B show a communication method. The method mainly includes the following procedure.

S1101: An access network device obtains security context information of at least one terminal device and an identifier set, where the access network device supports a 3GPP access technology. It may be understood that, that the access network device supports the 3GPP access technology may include that the access network device supports an air interface transmission technology such as 4G/5G.

Specifically, the security context information of the at least one terminal device and the identifier set may be pre-configured in the access network device, or may be from at least one fixed network gateway device.

The security context information is used to establish a security connection between the access network device and the terminal device. The security context information may specifically include one or more pieces of information used to establish the security connection, such as a root key, a public key, a private key, and a certificate. The establishment of the security connection may include a procedure such as an authentication procedure or a key agreement procedure. The identifier set may include a first sequence set and a second sequence set. It may be understood that the first sequence set includes at least one sequence number currently used to indicate the security context information of the terminal device, and the second sequence set includes a plurality of sequence numbers currently not used to indicate the security context information of the terminal device. Sequence numbers in the first sequence set/second sequence set may dynamically change. For example, after an authentication procedure is completed, a sequence number may be selected from the second sequence set, for example, denoted as a sequence number A; and a sequence number (for example, denoted as a sequence number B) currently corresponding to security context information in the authentication procedure is replaced with the foregoing selected sequence number A. That is, the selected sequence number A is incorporated into the first sequence set, and the original sequence number B in the first sequence set is removed. Optionally, the sequence number B may be incorporated into the second sequence set for subsequent use.

S1102: The access network device obtains fourth information from a first terminal device, where the fourth information is used to determine security context information of the first terminal device.

The first terminal device may be any one of the at least one terminal device mentioned in Snot Optionally, the fourth information includes a first sequence number corresponding to the security context information of the first terminal device. Optionally, the first sequence number may be a terminal identifier or a security context identifier corresponding to the first terminal device.

The fourth information may further include identification information of a fixed network corresponding to a fixed network gateway device supported by the first terminal device, and the identification information of the fixed network may include a fixed network identifier and/or a fixed network service provider identifier. For example, the fixed network gateway device supported by the first terminal device is a first fixed network gateway device, that is, the first fixed network gateway device may provide a fixed network service for the first terminal device, and the fourth information includes identification information of a fixed network corresponding to the first fixed network gateway device. The first fixed network gateway device may be included in the at least one fixed network gateway device connected to the access network device.

Before the access network device obtains the fourth information, the first terminal device may further complete a network selection according to any one of the foregoing two network selection methods. It may be understood that the first terminal device selects the access network device described in S1102, and the first terminal device establishes a control plane connection to the access network device. In this case, the access network device may receive, through the control plane connection between the access network device and the first terminal device, the fourth information sent by the first terminal device. In addition, in a network selection process, if the terminal device implicitly reports a type, the access network device may determine a type of the first terminal device based on interaction between the terminal device and the access network device. Alternatively, if the terminal device explicitly reports a type, for example, sends first information to the access network device, the first information may indicate that a type of the first terminal device is a target type, and the target type includes one or more of a residential gateway, a home terminal, and customer-premises equipment, and may further include a mobile phone, an AR terminal/a VR terminal, a Pad, and another type of terminal. This is not limited in embodiments of this application. In this case, the access network device may also determine the type of the first terminal device by obtaining the first information from the terminal device.

For example, the following process is shown in S1102 in FIG. 11A and FIG. 11B: The first terminal device completes the network selection, and establishes the control plane connection to the access network device, and the access network device receives the fourth information from the first terminal device through the control plane connection.

S1103: The access network device establishes a security connection between the access network device and the first terminal device based on the fourth information.

Specifically, the access network device may obtain the security context information of the at least one terminal device and the identifier set. For example, the access network device may obtain, based on the first information described in S1101, the security context information of the at least one terminal device and the identifier set from the first information. Then, the access network device determines that a first sequence number set in the identifier set includes the first sequence number, and the access network device may obtain, based on the first sequence number, the security context information of the first terminal device from the security context information of the at least one terminal device, and establish the security connection between the access network device and the first terminal device by using the security context information of the first terminal device. For example, the access network device may perform mutual authentication with the first terminal device based on the security context information corresponding to the first sequence number, to determine that both the access network device and the first terminal device are trusted devices for each other.

The security connection between the access network device and the first terminal device is established. The access network device may further replace the first sequence number with a second sequence number in a second sequence number set, and send the second sequence number to the first terminal device, where the second sequence number is used to indicate the security context information of the first terminal device. Alternatively, it may be understood that after the security connection between the access network device and the first terminal device is established, a sequence number that is stored in the first terminal device and that is used to indicate the security context information of the first terminal device is updated from the original first sequence number to the second sequence number. In addition, it should be noted that an implementation time period (or referred to as an implementation phase) of replacing the first sequence number with the second sequence number may be performed immediately after S1103, for example, after S1103 and before S1104, the first sequence number is replaced with the second sequence number; or the first sequence number may be replaced with the second sequence number after the first terminal device accesses the fixed network. In this embodiment of this application, a specific implementation time period of an operation of replacing the first sequence number with the second sequence number is not limited. For example, S1112 to S1114 after Sim in FIG. 11A and FIG. 11B show the operation of replacing the first sequence number with the second sequence number.

S1104: The access network device establishes a user plane connection to the first terminal device.

It may be understood that the user plane connection established between the first terminal device and the access network device in S1104 in this procedure corresponds to an established temporary user plane resource, and the temporary user plane resource may be used to carry the DHCP discover message or the PADI message sent by the first terminal device to the access network device in S1105. Optionally, S1104 may be used as an optional procedure, and may be omitted, that is, S1105 is directly performed after S1103 is performed.

S1105: The access network device sends second information to the first fixed network gateway device, where the second information is used to request to manage a connection between the first terminal device and the first fixed network gateway device. The management includes establishment, modification, release, deletion, or the like.

In an optional implementation, if the first terminal device needs to communicate with the first fixed network gateway device through an IPoE protocol, the access network device may obtain a DHCP discover message from the first terminal device. The access network device adds identification information of the first terminal device to the DHCP discover message sent by the first terminal device. The identification information of the first terminal device may be determined based on a MAC address of the first terminal device or the first sequence number. For example, the identification information of the first terminal device may be the first sequence number or a line identifier (Line ID). Alternatively, the identification information of the first terminal device may be determined based on a location of the first terminal device. For example, in Manner 2, the Line ID may be used as the identification information of the first terminal device, and is used to indicate the location of the first terminal device. Optionally, the first terminal device may send the DHCP discover message to the access network device through the control plane connection between the first terminal device and the access network device; or when S1104 is performed, that is, the user plane connection is established, the first terminal device may send the DHCP discover message to the access network device via the user plane connection between the first terminal device and the access network device.

In another optional implementation, if the first terminal device needs to communicate with the first fixed network gateway device by using a PPPoE protocol, the access network device may obtain a PPPoE active discovery initiation (PPPoE active discovery initiation, PADI) message from the first terminal device. The access network device adds identification information of the first terminal device to the PADI message sent by the first terminal device. The identification information of the first terminal device may be determined based on a MAC address of the first terminal device or the first sequence number. For example, the identification information of the first terminal device may be the first sequence number or a line identifier (Line ID). Alternatively, the identification information of the first terminal device may be determined based on a location of the first terminal device. For example, in Manner 2, the Line ID may be used as the identification information of the first terminal device, and is used to indicate the location of the first terminal device. Optionally, the first terminal device may send the PADI message to the access network device through the control plane connection between the first terminal device and the access network device; or when S1104 is performed, that is, the user plane connection is established, the first terminal device may send the PADI message to the access network device via the user plane connection between the first terminal device and the access network device. For example, the first terminal device needs to communicate with the first fixed network gateway device by using the IPoE protocol in FIG. 11A and FIG. 11B, and FIG. 11A and FIG. 11B show S1105: The first terminal device sends the DHCP discover message to the access network device; the access network device adds the identification information of the first terminal device to the DHCP discover message sent by the first terminal device, that is, generates the second information; and the access network device sends, to the first fixed network gateway device, a DHCP discover message to which the identification information of the first terminal device is added.

S1106: The first fixed network gateway device sends the received DHCP discover message to a DHCP server.

S1107: The DHCP server sends an access request (access request) message to the AAA server. The access request message carries the identification information of the first terminal device.

The AAA server may determine, based on the identification information of the first terminal device, subscription data information corresponding to the first terminal device, where the subscription data information is used to determine that the first terminal device is allowed to obtain a service by using the first fixed network gateway device, or the subscription data information is used to determine that the first terminal device is not allowed to obtain a service by using the first fixed network gateway device. The subscription data information may include one or more pieces of fixed network service information, QoS information, and priority information. The QoS information and/or the priority information may be used as a basis for subsequently adjusting a temporary user plane resource previously configured by the first terminal device. Further, the AAA server may determine, based on the subscription data information corresponding to the first terminal device, whether the first terminal device is allowed to obtain the service by using the first fixed network gateway device, or determine whether the first terminal device can be authenticated.

For a case in which the first terminal device is allowed to obtain the service by using the first fixed network gateway device, it may be understood as that the first terminal device has permission to obtain the service, and the first terminal device is capable of obtaining the service by using the first fixed network gateway device; or in other words, the first terminal device enables the service that needs to be obtained by using the first fixed network gateway device. For a case in which the first terminal device is not allowed to obtain the service by using the first fixed network gateway device, it may be understood as that the first terminal device does not have permission to obtain the service, or the first terminal device is not capable of obtaining the service by using the first fixed network gateway device; or in other words, the first terminal device disables the service that needs to be obtained by using the first fixed network gateway device.

S1108: If the AAA server determines that the first terminal device can be authenticated, the AAA server may send an access accept (access accept) message to the DHCP server; or if the AAA server determines that the first terminal device cannot be authenticated, the AAA server may send an access deny (access deny) message to the DHCP server.

For example, FIG. 11A and FIG. 11B show a case in which the AAA server sends the access accept message to the DHCP server.

S1109: If the DHCP server receives the access accept message, the DHCP server may send a DHCP response message to the first terminal device by using the first fixed network gateway device and the access network device; or if the DHCP server receives the access deny message, the DHCP server may send a DHCP NACK message to the first terminal device by using the first fixed network gateway device and the access network device.

It may be understood that the DHCP server may send the DHCP response (DHCP offer) message to the first terminal device by using the first fixed network gateway device and the access network device.

For example, FIG. 11A and FIG. 11B show a case in which the DHCP server sends the DHCP response message to the first terminal device by using the first fixed network gateway device and the access network device. Specifically, the DHCP server sends the DHCP response message to the first fixed network gateway device, the first fixed network gateway device forwards the DHCP response message to the access network device, and the access network device forwards the DHCP response message to the first terminal device.

S1110: The first terminal device may send a DHCP request (DHCP request) message to the DHCP server by using the access network device and the first fixed network gateway device.

S1111: The DHCP server may send third information to the first terminal device by using the first fixed network gateway device and the access network device, where the third information indicates that the connection between the first terminal device and the first fixed network gateway device is successfully established.

Specifically, the DHCP server sends the third information to the first fixed network gateway device, the first fixed network gateway device forwards the third information to the access network device, and the access network device forwards the third information to the first terminal device. If the access network device receives the third information, it may be determined that the connection between the first terminal device and the first fixed network gateway device is successfully established. If the access network device does not receive the third information, it may be considered that the connection between the first terminal device and the first fixed network gateway device is not successfully established.

Optionally, as shown in S1111 in FIG. 11A and FIG. 11B, the third information may be specifically implemented by using a DHCP ACK message.

The third information may further include at least one of the following: the identification information of the first terminal device; authentication information of the first terminal device, where the authentication information indicates that the first terminal device passes authentication of the fixed network corresponding to the first fixed network gateway device, or the authentication information indicates that the first terminal device fails to pass authentication of the fixed network corresponding to the first fixed network gateway device; and the subscription data information corresponding to the first terminal device, where the subscription data information includes one or more pieces of the fixed network service information, the QoS information, and the priority information. For example, when the third information is implemented by using the DHCP ACK message, the DHCP ACK message may include the subscription data information corresponding to the first terminal device and the authentication information of the first terminal device, where the authentication information included in the DHCP ACK message indicates that the first terminal device can be authenticated by the fixed network corresponding to the first fixed network gateway device; or, the DHCP ACK message indicates that the first terminal device can be authenticated by the fixed network corresponding to the first fixed network gateway device, and the DHCP ACK message may include only the subscription data information corresponding to the first terminal device.

Further, the access network device may perform a user plane connection management procedure based on the third information. The user plane management procedure includes at least one of the following operations: reserving the user plane resource, establishing the user plane resource, modifying the user plane resource, or releasing the user plane resource.

For example, for reserving the user plane resource, the access network device may reserve the temporary user plane resource based on the subscription data information corresponding to the first terminal device, and does not adjust the temporary user plane resource; for establishing the user plane resource, the access network device may add, based on the subscription data information corresponding to the first terminal device, a user plane resource based on the temporary user plane resource; for modifying the user plane resource, the access network device may modify, based on the subscription data information corresponding to the first terminal device, the user plane resource based on the temporary user plane resource; and for releasing the user plane resource, the access network device may release the temporary user plane resource when receiving the DHCP NACK message.

S1112: The access network device replaces the first sequence number with the second sequence number in the second sequence number set.

S1113: The access network device sends update indication information to the first terminal device, where the update indication information indicates the first terminal device to update a sequence number corresponding to the security context information of the first terminal device.

Optionally, the update indication information may include the second sequence number. Further, the update indication information may further include the identification information of the fixed network corresponding to the fixed network gateway device supported by the first terminal device mentioned in S1102. In addition, the update indication information may also be understood as indicating the first terminal device to update the fourth information.

S1114: The first terminal device sends update response information to the access network device in response to the update indication information, where the update response information indicates that the first terminal device successfully receives the update indication information.

In addition, it should be noted that, if the first terminal device needs to communicate with the first fixed network gateway device by using the PPPoE protocol, the DHCP discover message sent by the first terminal device in S1105 may be replaced with the PADI message. Subsequent S1107 to Sum may also be correspondingly adjusted based on a PPPoE communication procedure, for example, S42 to S48. Details are not described in this embodiment of this application. A part or all of a procedure S1101 to S1111 in the foregoing manner 1 may be selectively performed based on an actual requirement. In other words, it should be understood that a part of the procedure S1101 to S1111 may be considered as an optional procedure, and may be performed or not performed. This is not limited in this embodiment of this application. For example, in some scenarios in which there is no need to perform authentication on the terminal device, S1104 may be performed after S1101 is performed, and S1102 and S1103 are not performed, or S1102 to S1104 are omitted. An execution sequence of the procedure S1101 to S1114 is not limited in this embodiment of this application. An execution sequence of a part of the procedure may be adjusted based on an actual situation, or a part of the procedure may be performed in parallel.

Further, for data transmission of the first terminal device, refer to the manner in FIG. 10. Details are not described again in this embodiment of this application.

Manner 2 provided in this embodiment of this application can simplify an access procedure of the terminal device, reduce signaling overheads, and reduce costs. The access network device performs the authentication procedure on the terminal device. After passing authentication, the access network device may establish a temporary user plane resource with the terminal device, to forward a related message that the terminal device expects to establish an IPoE or a PPPoE connection. The DHCP ACK message includes subscription data information corresponding to a terminal device. The access network device can establish or modify, based on the subscription data information, a user plane resource of the terminal device in a targeted manner, so that differentiated processing can be implemented between different terminal devices, and user experience can be improved.

Manner 3: The fixed network gateway device performs authentication on the terminal device, and sends authentication information to the access network device. The access network device establishes a security connection to the terminal device (when the authentication succeeds) or releases an air interface resource (when the authentication fails) based on the authentication information.

Figure 12A:
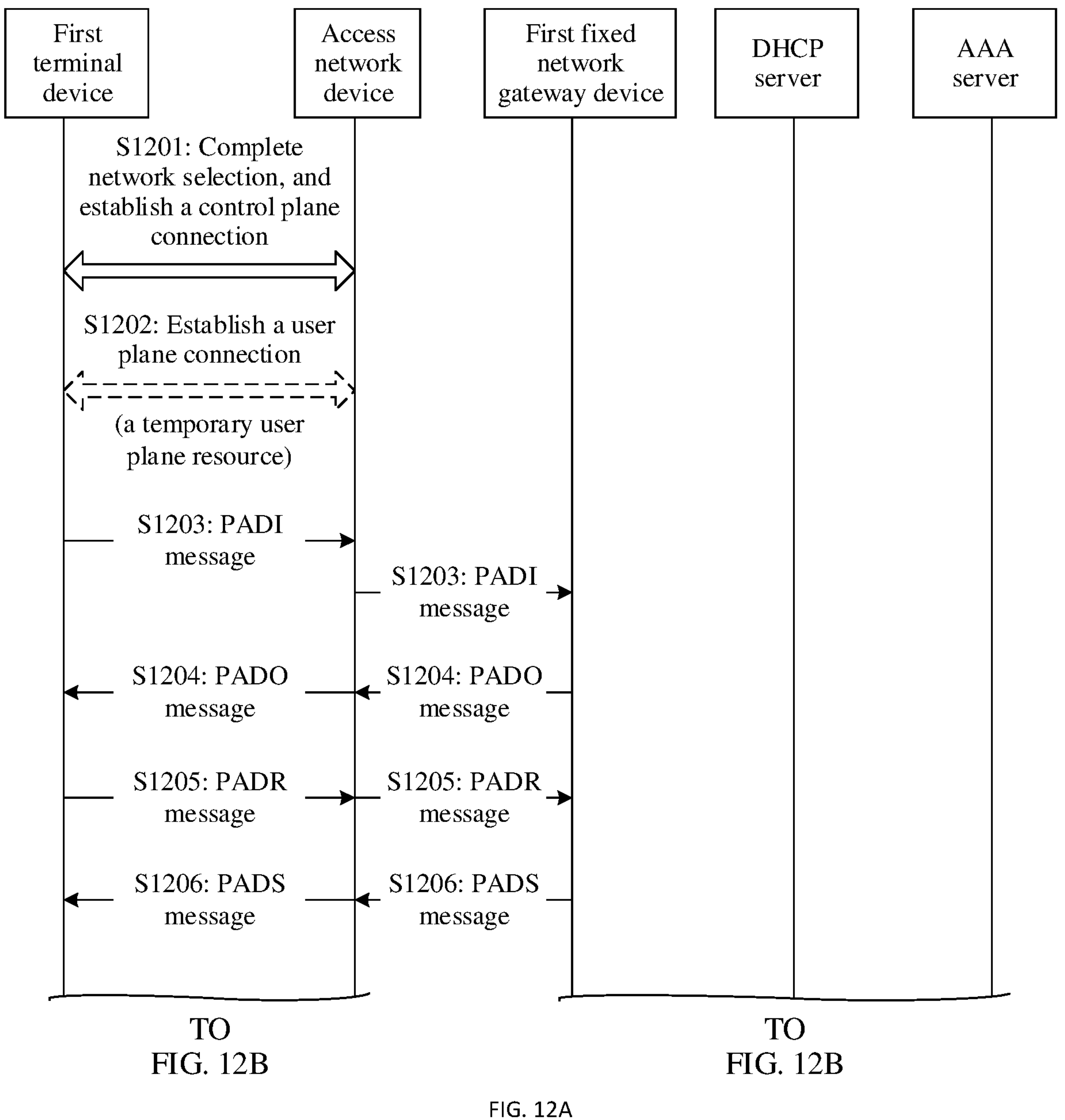
FIG. 12A and FIG. 12B are a schematic flowchart of a communication method according to an embodiment of this application.
Figure 12B:
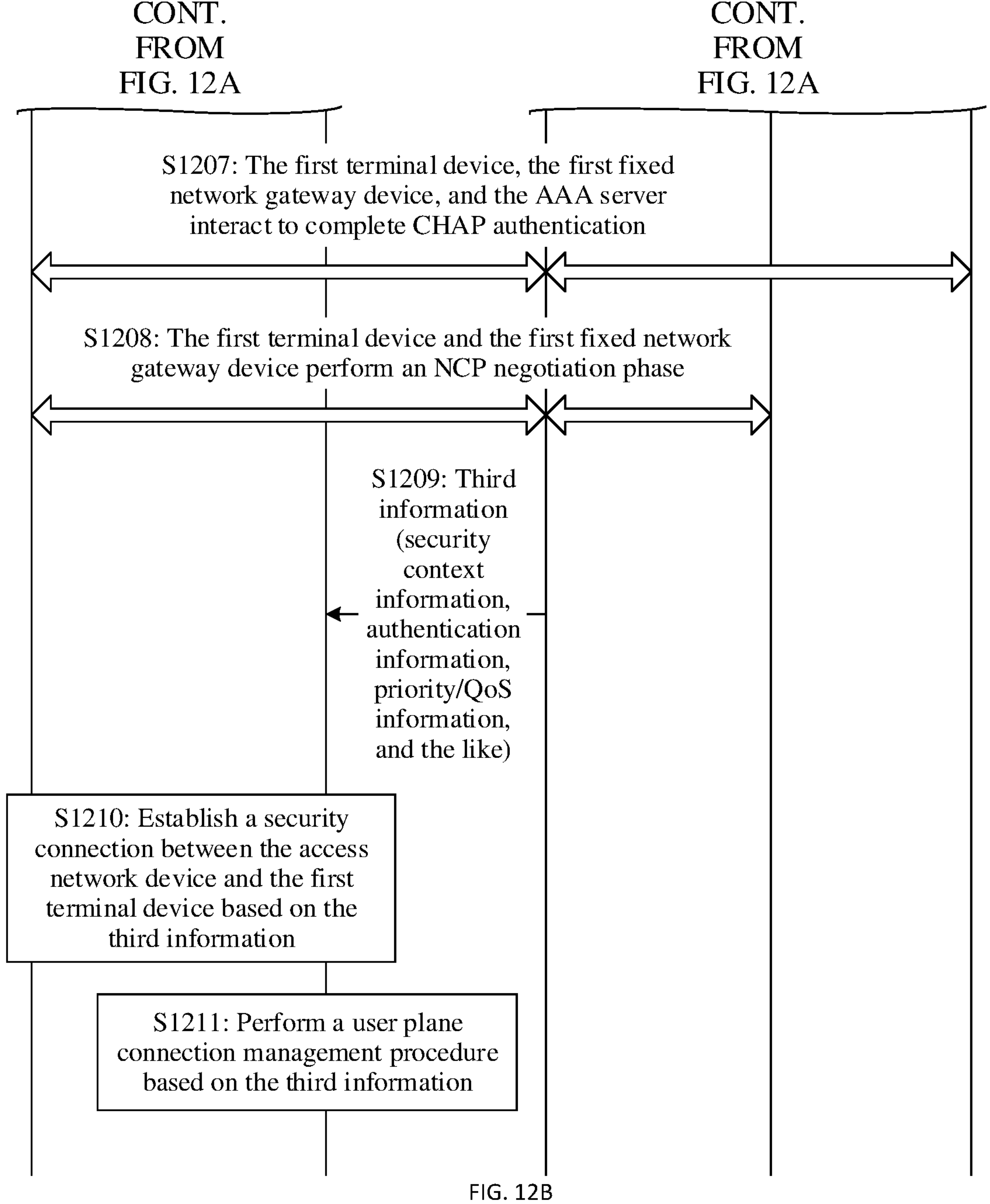

FIG. 12A and FIG. 12B show a communication method. The method mainly includes the following procedure.

S1201: A first terminal device completes to select a network, and establishes a control plane connection to an access network device.

The first terminal device may complete to select the network according to any one of the foregoing two network selection methods. It may be understood that the first terminal device selects the access network device described in FIG. 12A and FIG. 12B and the fixed network corresponding to the first fixed network gateway device, and the first terminal device establishes the control plane connection to the access network device.

In a network selection process, if the terminal device implicitly reports a type, the access network device may determine a type of the first terminal device based on interaction between the terminal device and the access network device. Alternatively, if the terminal device explicitly reports a type, for example, sends first information to the access network device, the first information may indicate that a type of the first terminal device is a target type, and the target type includes one or more of a residential gateway, a home terminal, and customer-premises equipment, and may further include a mobile phone, an AR terminal/a VR terminal, a Pad, and another type of terminal. This is not limited in embodiments of this application. In this case, the access network device may also determine the type of the first terminal device by obtaining the first information from the terminal device.

S1202: The access network device establishes a user plane connection to the first terminal device.

It may be understood that the user plane connection established between the first terminal device and the access network device in S1204 in this procedure corresponds to an established temporary user plane resource, and the temporary user plane resource may be used to carry the DHCP discover message or the PADI message sent by the first terminal device to the access network device in S1203. S1202 may be used as an optional procedure, and may be omitted, that is, S1203 is directly performed after S1201 is performed.

S1203: The access network device sends second information to the first fixed network gateway device, where the second information is used to request to manage a connection between the first terminal device and the first fixed network gateway device. The management includes establishment, modification, release, deletion, or the like.

In an optional implementation, if the first terminal device needs to communicate with the first fixed network gateway device through an IPoE protocol, the access network device may obtain a DHCP discover message from the first terminal device. The access network device adds identification information of the first terminal device to the DHCP discover message sent by the first terminal device. The identification information of the first terminal device may be determined based on a MAC address of the first terminal device or a C-RNTI of the first terminal device, and the C-RNTI is an identifier used by the access network device to mark the first terminal device. Alternatively, the identification information of the first terminal device may be determined based on a location of the first terminal device. For example, in Manner 3, a Line ID may be used as the identification information of the first terminal device, and is used to indicate the location of the first terminal device. Optionally, the first terminal device may send the DHCP discover message to the access network device through the control plane connection between the first terminal device and the access network device; or when S1202 is performed, that is, the user plane connection is established, the first terminal device may send the DHCP discover message to the access network device via the user plane connection between the first terminal device and the access network device.

In another optional implementation, if the first terminal device needs to communicate with the first fixed network gateway device by using a PPPoE protocol, the access network device may obtain a PPPoE active discovery initiation (PADI) message from the first terminal device. The access network device adds identification information of the first terminal device to the PADI message sent by the first terminal device. The identification information of the first terminal device may be determined based on a MAC address of the first terminal device or a C-RNTI of the first terminal device, and the C-RNTI is an identifier used by the access network device to mark the first terminal device. Alternatively, the identification information of the first terminal device may be determined based on a location of the first terminal device. For example, in Manner 3, a Line ID may be used as the identification information of the first terminal device, and is used to indicate the location of the first terminal device. Optionally, the first terminal device may send the PADI message to the access network device through the control plane connection between the first terminal device and the access network device; or when S1202 is performed, that is, the user plane connection is established, the first terminal device may send the PADI message to the access network device via the user plane connection between the first terminal device and the access network device.

For example, the first terminal device needs to communicate with the first fixed network gateway device by using the PPPoE protocol in FIG. 12A and FIG. 12B, and FIG. 12A and FIG. 12B show S1203: The first terminal device sends the PADI message to the access network device; the access network device adds the identification information of the first terminal device to the PADI message sent by the first terminal device, that is, generates the second information; and the access network device sends, to the first fixed network gateway device, a PADI message to which the identification information of the first terminal device is added.

S1204: After receiving the PADI message, the first fixed network gateway device sends a PPPoE active discovery response (PADO) message to the first terminal device by using the access network device, to respond as a response.

S1205: The first terminal device sends a PPPoE active discovery request (PADR) message to the first fixed network gateway device by using the access network device.

S1206: After receiving the PADR message, the first fixed network gateway device sends a PPPoE active discovery session-configuration (PADS) message as a response to the first terminal device by using the access network device.

S1207: The first terminal device, the first fixed network gateway device, and an AAA server interact to complete challenge handshake authentication protocol (CHAP) authentication. The first fixed network gateway device forwards an authentication message between the first terminal device and the AAA server. The authentication mode may be authentication by using a user name and a password, and the message is transmitted in a ciphertext manner. This is secure.

S1208: The first terminal device and the first fixed network gateway device perform a network side parameter (NCP) negotiation phase, which relates to interaction between the first fixed network gateway device and the DHCP, and the first terminal device may obtain an IP address in this phase.

S1209: The first fixed network gateway device learns that the first terminal device can be authenticated, and sends third information to the access network device through an interface between the first fixed network gateway device and the access network device, where the third information indicates that the connection between the first terminal device and the first fixed network gateway device is successfully established.

Optionally, the third information may include one or more of the following information: the identification information of the first terminal device; security context information of the first terminal device; authentication information of the first terminal device, where the authentication information indicates whether the first terminal device passes authentication of the fixed network corresponding to the first fixed network gateway device, or the authentication information indicates whether the first terminal device can be authenticated by the AAA server associated with the first fixed network gateway device; subscription data information corresponding to the first terminal device, where the subscription data information includes one or more pieces of fixed network service information, QoS information, and priority information; and security context information of the first terminal device, where the security context information is used to establish a security connection between the access network device and the first terminal device, and the security context information may specifically include one or more pieces of information used to establish the security connection, such as a root key, a public key, a private key, and a certificate. The establishment of the security connection may include a procedure such as an authentication procedure or a key agreement procedure.

S1210: The access network device may identify the first terminal device based on the identification information of the first terminal device, and when the authentication information of the first terminal device indicates that the first terminal device can be authenticated by the AAA server, establish the security connection between the access network device and the first terminal device by using the security context information of the first terminal device in the third information. For example, the access network device performs mutual authentication with the first terminal device by using the security context information of the first terminal device. If the authentication information of the first terminal device indicates that the first terminal device cannot be authenticated by the AAA server, the access network device does not need to perform mutual authentication with the first terminal device.

For example, FIG. 12A and FIG. 12B show a case in which the authentication information of the first terminal device indicates that the first terminal device can be authenticated by the AAA server.

S1211: The access network device may perform a user plane connection management procedure based on the third information. The user plane management procedure includes at least one of the following operations: reserving the user plane resource, establishing the user plane resource, modifying the user plane resource, or releasing the user plane resource.

When the authentication information of the first terminal device indicates that the first terminal device can be authenticated by the AAA server, the access network device may perform, based on the subscription data information corresponding to the first terminal device, one or more of the following operations: reserving the user plane resource, establishing the user plane resource, or modifying the user plane resource. When the authentication information of the first terminal device indicates that the first terminal device cannot be authenticated by the AAA server, the access network device may perform the operation of releasing the user plane resource.

For example, for reserving the user plane resource, the access network device may reserve the temporary user plane resource in S1202 based on the subscription data information corresponding to the first terminal device, and does not adjust the temporary user plane resource; for establishing the user plane resource, the access network device may add, based on the subscription data information corresponding to the first terminal device, a user plane resource based on the temporary user plane resource in S1202; for modifying the user plane resource, the access network device may modify, based on the subscription data information corresponding to the first terminal device, the user plane resource based on the temporary user plane resource; and for releasing the user plane resource, the access network device may release the temporary user plane resource when determining that the first terminal device cannot be authenticated by the AAA server.

An execution sequence of S1210 and S1211 is not limited in this embodiment of this application. S1210 may be performed before S1211, or S1211 may be performed before S1210.

In addition, it should be noted that, if the first terminal device needs to communicate with the first fixed network gateway device by using the IPoE protocol, the PADI message sent by the first terminal device in S1204 may be replaced with the DHCP discover message. Subsequent S1205 to S1211 may also be correspondingly adjusted based on an IPoE communication procedure, for example, S31 to S36. Details are not described in this embodiment of this application. A part or all of a procedure S1201 to S1211 in the foregoing manner 1 may be selectively performed based on an actual requirement. In other words, it should be understood that a part of the procedure S1201 to S1211 may be considered as an optional procedure, and may be performed or not performed. This is not limited in this embodiment of this application. For example, in some scenarios in which there is no need to perform authentication on the terminal device, S1210 may be omitted. An execution sequence of the procedure S1201 to S1211 is not limited in this embodiment of this application. An execution sequence of a part of the procedure may be adjusted based on an actual situation, or a part of the procedure may be performed in parallel.

Further, for data transmission of the first terminal device, refer to the manner in FIG. 10. Details are not described again in this embodiment of this application.

Manner 3 provided in this embodiment of this application can simplify an access procedure of the terminal device, reduce signaling overheads, and reduce costs. After the terminal device and the fixed network gateway device complete authentication, the fixed network gateway device sends an authentication result, the security context information, the priority information, the QoS information, and the like about the terminal device to the access network device through the enhanced interface. This can reduce leakage of the foregoing information, and improve communication security. In this way, the access network device can also establish or modify, based on the priority information and the QoS information, the user plane resource of the terminal device in a targeted manner, so that differentiated processing can be implemented between different terminal devices, and user experience can be improved.

Figure 13:
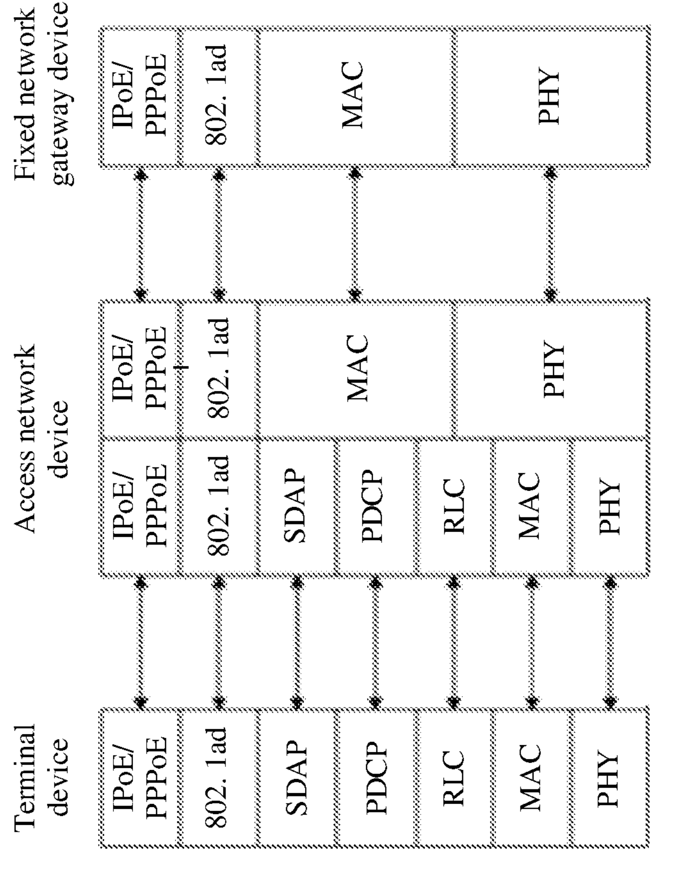
FIG. 13 is a schematic diagram of an architecture of another protocol stack according to an embodiment of this application.

Solution 2:

As shown in FIG. 13, an embodiment of this application provides another protocol stack architecture, and specifically shows a control plane protocol stack and a user plane protocol stack. In an optional implementation, the protocol stack architecture may be constructed by implementing Solution 2, or it may be understood that the protocol stack architecture is used in Solution 2. It should be noted that FIG. 13 is a possible implementation, and another protocol stack architecture is also applied to Solution 2. This is not limited in this embodiment of this application.

A control plane protocol stack on each of a terminal device side and an access network device side is divided into an RRC layer, a packet data convergence protocol (PDCP) layer, a radio link control protocol (RLC) layer, a medium access control (medium access control, MAC) layer, and a physical (PHY) layer. A user plane protocol stack on a terminal device side is divided into an IPoE/a PPPoE protocol layer, an 802.1ad protocol layer, a service data adaptation protocol (SDAP) layer, a PDCP layer, an RRC layer, an RLC layer, a MAC layer, and a PHY layer. A user plane protocol stack on an access network device side that communicates with the terminal device is divided into an IPoE/a PPPoE protocol layer, an 802.1ad protocol layer, an SDAP layer, a PDCP layer, an RRC layer, an RLC layer, a MAC layer, and a PHY layer. A user plane protocol stack on the access network device side that communicates with a fixed network gateway device is divided into an IPoE/a PPPoE protocol layer, an 802.1ad protocol layer, a MAC layer, and a PHY layer. A user plane protocol stack on a fixed network gateway device side is divided into an IPoE/a PPPoE protocol layer, an 802.1ad protocol layer, a MAC layer, and a PHY layer. An access network device may fully support a 3GPP protocol stack, or may support a part of a 3GPP protocol stack. For example, the access network device may support a part or all of a protocol stack in a PHY layer, a MAC layer, an RLC layer, a PDCP layer, an SDAP layer, and an RRC layer.

An access network device supports a 3GPP access technology, and the terminal device may perform transmission with the access network device by using the 3GPP technology (or referred to as a cellular air interface). For example, the terminal device may establish a control plane connection to the access network device, and a control plane message may be transmitted by using RRC signaling. The terminal device may establish a user plane connection to the access network device, and a user plane message may be transmitted via the user plane connection. The access network device establishes a connection with the fixed network gateway device, for example, a fixed network connection, performs data transmission according to an IPoE/a PPPoE protocol. In this case, the access network device can send data from the terminal device to the fixed network gateway device, and can also send data from the fixed network gateway device to the terminal device. The access network device may also be understood as a bridge between the terminal device and the fixed network gateway device. In addition, it should be noted that, because the terminal device does not need to interact with a core network, the terminal device in Solution 1 does not need to support a protocol layer related to the core network, for example, a non-access stratum (NAS).

The following describes in detail an implementation of performing authorization and/or authentication on the terminal device in a network access process.

Figure 14A:
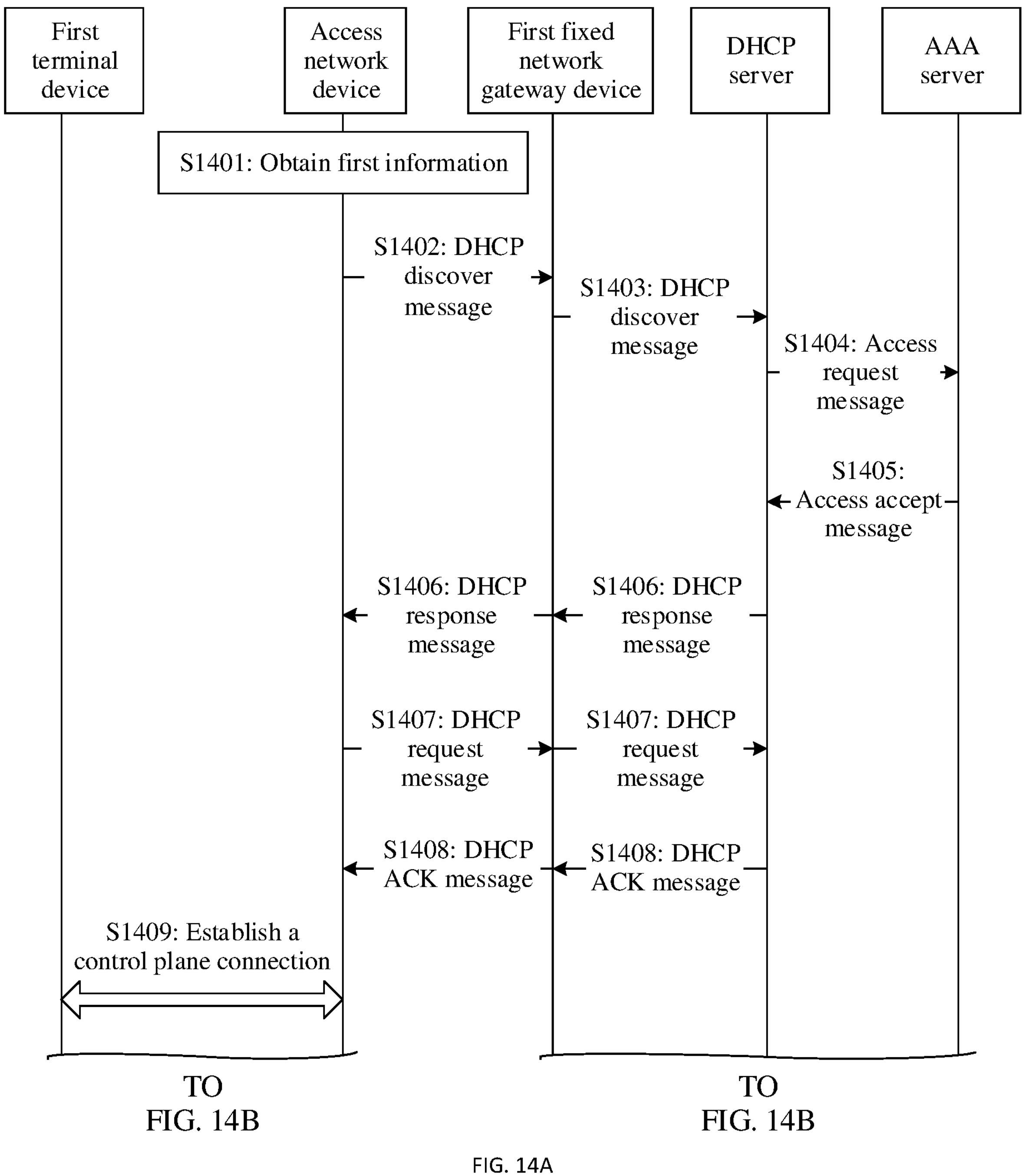
FIG. 14A and FIG. 14B are a schematic flowchart of a communication method according to an embodiment of this application.
Figure 14B:
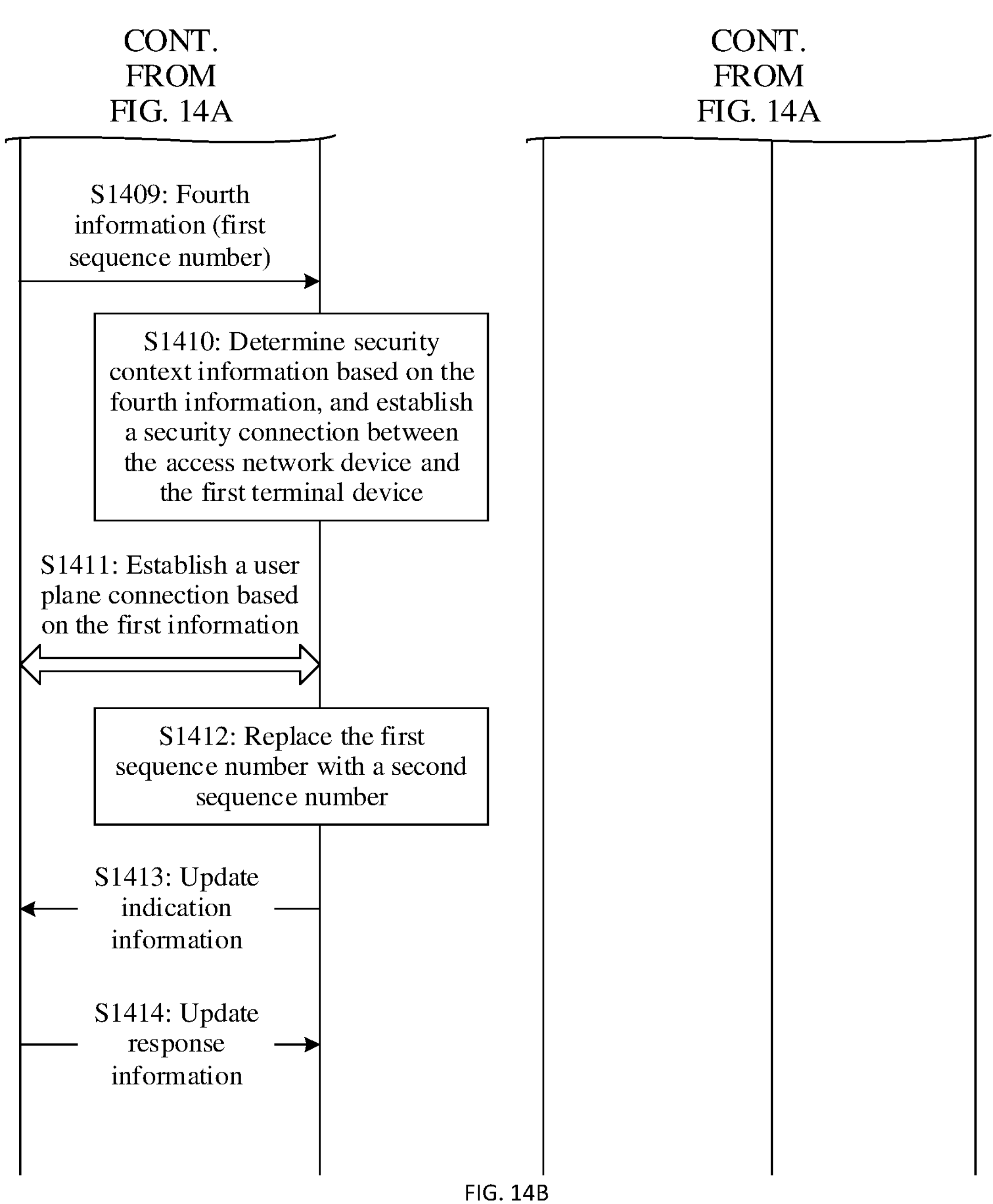

FIG. 14A and FIG. 14B show a communication method. The method mainly includes the following procedure.

S1401: An access network device obtains first information, where the access network device supports a 3GPP access technology. That the access network device supports the 3GPP access technology may include that the access network device supports an air interface transmission technology such as 4G/5G.

The first information may be information pre-stored in the access network device, or the first information is obtained from at least one fixed network gateway device connected to the access network device. The first information includes subscription data information corresponding to at least one terminal device, where the subscription data information is used to determine that the terminal device is allowed to obtain a service by using the fixed network gateway device, or the subscription data information is used to determine that the terminal device is not allowed to obtain a service by using the fixed network gateway device. The subscription data information may include one or more pieces of fixed network service information, QoS information, and priority information. The QoS information and/or the priority information may be used as a basis for subsequently configuring a user plane resource by the terminal device.

The first information may further include security context information of the at least one terminal device and an identifier set. The security context information may specifically include one or more pieces of information used to establish the security connection, such as a root key, a public key, a private key, and a certificate. The establishment of the security connection may include a procedure such as an authentication procedure or a key agreement procedure. The identifier set may include a first sequence set and a second sequence set. It may be understood that the first sequence set includes at least one sequence number currently used to indicate the security context information of the terminal device, and the second sequence set includes a plurality of sequence numbers currently not used to indicate the security context information of the terminal device. Sequence numbers in the first sequence set/second sequence set may dynamically change. For example, after an authentication procedure is completed, a sequence number may be selected from the second sequence set, for example, denoted as a sequence number A; and a sequence number (for example, denoted as a sequence number B) currently corresponding to security context information in the authentication procedure is replaced with the foregoing selected sequence number A. That is, the selected sequence number A is incorporated into the first sequence set, and the original sequence number B in the first sequence set is removed. Optionally, the sequence number B may be incorporated into the second sequence set for subsequent use.

In addition, optionally, the first information may further include an IP address resource pool, and the IP address resource pool includes a plurality of to-be-allocated IP addresses.

S1402: The access network device sends a DHCP discover (DHCP discover) message or a PADI message to at least one fixed network gateway device, where the DHCP discover message or the PADI message is used to request to establish a connection between the access network device and the at least one fixed network gateway device, for example, a fixed network connection.

For example, the DHCP discover message or the PADI message may carry an accessible identifier, for example, an accessible Line ID, to ensure that the access network device can be authenticated to successfully establish a connection with the fixed network gateway device. For example, the access network device needs to communicate with a first fixed network gateway device in the at least one fixed network gateway device by using the IPoE protocol in FIG. 14A and FIG. 14B, and FIG. 14A and FIG. 14B show S1402: The access network device sends the DHCP discover message to the first fixed network gateway device.

S1403: The first fixed network gateway device sends the received DHCP discover message to a DHCP server.

S1404: The DHCP server sends an access request message to an AAA server, where the access request message carries an accessible identifier in the DHCP discover message, so that the AAA server determines, based on the accessible identifier, that the access network device can be authenticated.

S1405: The AAA server obtains the accessible identifier, and the AAA server may send an access accept message to the DHCP server.

S1406: The DHCP server receives the access accept (access accept) message, and the DHCP server may send a DHCP response message to the access network device by using the first fixed network gateway device.

S1407: The access network device sends a DHCP request message to the DHCP server by using the first fixed network gateway device.

S1408: The DHCP server sends a DHCP ACK message to the access network device by using the first fixed network gateway device, where the DHCP ACK message indicates that the connection between the access network device and the first fixed network gateway device is successfully established.

S1409: The access network device obtains fourth information from a first terminal device, where the fourth information is used to determine security context information of the first terminal device.

The first terminal device may be any one of the at least one terminal device mentioned in S1401. Optionally, the fourth information includes a first sequence number corresponding to the security context information of the first terminal device. Optionally, the first sequence number may be a terminal identifier or a security context identifier corresponding to the first terminal device.

Optionally, the fourth information may further include identification information of a fixed network corresponding to a fixed network gateway device supported by the first terminal device, and the identification information of the fixed network may include a fixed network identifier and/or a fixed network service provider identifier. For example, the fixed network gateway device supported by the first terminal device is the first fixed network gateway device, that is, the first fixed network gateway device may provide a fixed network service for the first terminal device, and the fourth information includes identification information of a fixed network corresponding to the first fixed network gateway device. The first fixed network gateway device may be included in the at least one fixed network gateway device that establishes a connection with the access network device.

Before the access network device obtains the fourth information, the first terminal device may further complete a network selection according to any one of the foregoing two network selection methods. It may be understood that the first terminal device selects the access network device described in FIG. 14A and FIG. 14B, and the first terminal device establishes a control plane connection to the access network device. In this case, the access network device may receive, through the control plane connection between the access network device and the first terminal device, the fourth information sent by the first terminal device.

For example, the following process is shown in S1409 in FIG. 14A and FIG. 14B: The first terminal device completes the network selection, and establishes the control plane connection to the access network device, and the access network device receives the fourth information from the first terminal device through the control plane connection.

S1410: The access network device establishes a security connection between the access network device and the first terminal device based on the fourth information.

Specifically, the access network device may obtain the security context information of the at least one terminal device and the identifier set. For example, the access network device may obtain, based on the first information described in S1401, the security context information of the at least one terminal device and the identifier set from the first information. Then, the access network device determines that a first sequence number set in the identifier set includes the first sequence number, and the access network device may obtain, based on the first sequence number, the security context information of the first terminal device from the security context information of the at least one terminal device, and establish the security connection between the access network device and the first terminal device by using the security context information of the first terminal device. For example, the access network device may perform mutual authentication with the first terminal device based on the security context information corresponding to the first sequence number, to determine that both the access network device and the first terminal device are trusted devices for each other.

After the security connection between the access network device and the first terminal device is established, the access network device may further replace the first sequence number with a second sequence number in a second sequence number set, and send the second sequence number to the first terminal device, where the second sequence number is used to indicate the security context information of the first terminal device. Alternatively, it may be understood that after the security connection between the access network device and the first terminal device is established, a sequence number that is stored in the first terminal device and that is used to indicate the security context information of the first terminal device is updated from the original first sequence number to the second sequence number. In addition, it should be noted that an implementation time period (or referred to as an implementation phase) of replacing the first sequence number with the second sequence number may be performed immediately after S1410, for example, after S1410 and before S1411, the first sequence number is replaced with the second sequence number; or the first sequence number may be replaced with the second sequence number after the first terminal device accesses the fixed network. In this embodiment of this application, a specific implementation time period of an operation of replacing the first sequence number with the second sequence number is not limited. For example, S1412 to S1414 after S1411 in FIG. 14A and FIG. 14B show the operation of replacing the first sequence number with the second sequence number.

S1411: The access network device establishes a user plane connection to the first terminal device based on the first information.

Optionally, the access network device determines, based on the subscription data information corresponding to the first terminal device, whether the first terminal device is allowed to obtain a service by using the first fixed network gateway device. The first terminal device is allowed to obtain the service by using the first fixed network gateway device. It may be understood as that the first terminal device has permission to obtain the service, and the first terminal device is capable of obtaining the service by using the first fixed network gateway device; or in other words, the first terminal device enables the service that needs to be obtained by using the first fixed network gateway device. The first terminal device is not allowed to obtain the service by using the first fixed network gateway device. It may be understood as that the first terminal device does not have permission to obtain the service, or the first terminal device is not capable of obtaining the service by using the first fixed network gateway device; or in other words, the first terminal device disables the service that needs to be obtained by using the first fixed network gateway device.

When the access network device determines that the first terminal device is allowed to obtain the service by using the first fixed network gateway device, the access network device establishes the user plane connection to the first terminal device based on the priority information, the QoS information, and the like in the subscription data information corresponding to the first terminal device, that is, establishes a user plane resource such as a data radio bearer (data radio bearer, DRB), and allocates an IP address to the first terminal device based on the IP address resource pool of the first information.

S1412: The access network device replaces the first sequence number with the second sequence number in the second sequence number set.

S1413: The access network device sends update indication information to the first terminal device, where the update indication information indicates the first terminal device to update a sequence number corresponding to the security context information of the first terminal device.

Optionally, the update indication information may include the second sequence number. Further, the update indication information may further include the identification information of the fixed network corresponding to the fixed network gateway device supported by the first terminal device mentioned in S1410. In addition, the update indication information may also be understood as indicating the first terminal device to update the fourth information.

S1414: The first terminal device sends update response information to the access network device in response to the update indication information, where the update response information indicates that the first terminal device successfully receives the update indication information.

In addition, it should be noted that, if the access network device needs to communicate with the first fixed network gateway device by using the PPPoE protocol, the DHCP discover message sent by the access network device in S1402 may be replaced with the PADI message. Subsequent S1402 to S1408 may also be correspondingly adjusted based on a PPPoE communication procedure, for example, S42 to S48. Details are not described in this embodiment of this application. A part or all of a procedure S1401 to S1414 in the foregoing manner 1 may be selectively performed based on an actual requirement. In other words, it should be understood that a part of the procedure S1401 to S1414 may be considered as an optional procedure, and may be performed or not performed. This is not limited in this embodiment of this application. For example, in some scenarios in which there is no need to perform sequence number update and replacement, S1412 to S1414 may not be performed. An execution sequence of the procedure S1401 to S1414 is not limited in this embodiment of this application. An execution sequence of a part of the procedure may be adjusted based on an actual situation, or a part of the procedure may be performed in parallel.

Further, because the access network device in Solution 2 has an IPoE protocol stack or a PPPoE protocol stack, the access network device may directly communicate with the fixed network gateway device as a fixed network terminal. Optionally, a connection shared by a plurality of terminal devices connected to the access network device may be established. An RAN may further perform network address translation (NAT), so that connections between the plurality of terminal devices and the access network device can be mapped to the connection between the access network device and the fixed network gateway device. The following uses an example in which two terminal devices (a first terminal device and a second terminal device) are connected to an access network device to describe in detail a method in which the access network device performs NAT in an uplink and downlink data transmission process of the terminal devices.

Figures 15, 16:
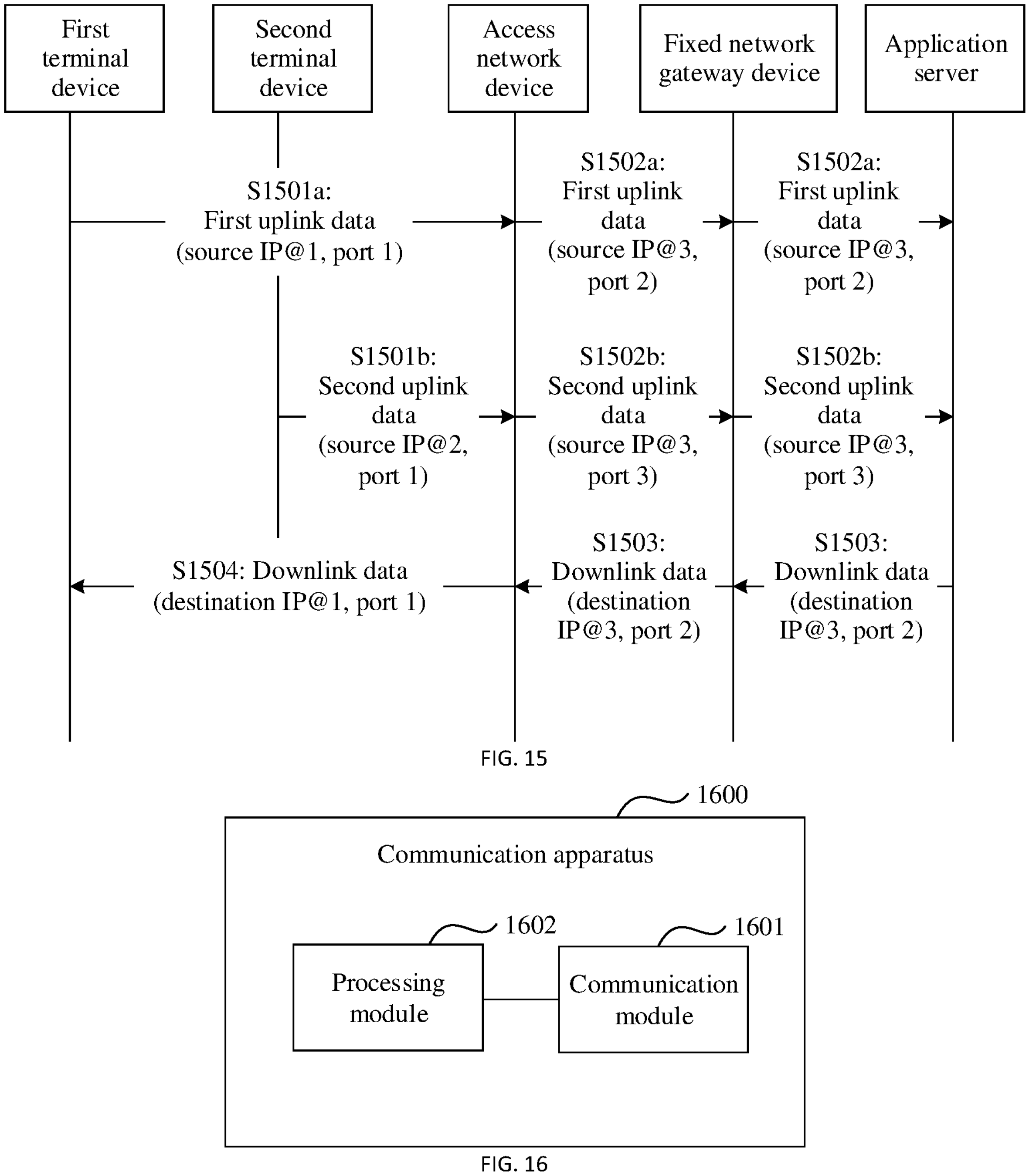
FIG. 15 is a schematic diagram of another data transmission procedure according to an embodiment of this application.
FIG. 16 is a schematic diagram of a structure of a communication apparatus according to an embodiment of this application.

FIG. 15 shows a data transmission manner of a terminal device, and the data transmission manner mainly includes the following procedure.

S1501*a*: The first terminal device sends first uplink data to the access network device, where a source IP address of a message corresponding to the first uplink data is denoted as IP@1, and a port number (port) is 1.

S1501*b*: The second terminal device sends second uplink data to the access network device, where a source IP address of a message corresponding to the second uplink data is denoted as IP@2, and a port number is 1.

The first uplink data sent by the first terminal device may be user plane data of the first terminal device, or may be user plane data of another terminal device that is within a coverage area of the first terminal device and that uses a wireless local area network communication capability provided by the first terminal device.

S1502*a*: The access network device replaces the source IP address of the message corresponding to the first uplink data with IP@3, and the port number (port) with 2, and sends, to an application server by using a fixed network gateway device, first uplink data obtained after the source IP address is replaced.

The second uplink data sent by the second terminal device may be user plane data of the second terminal device, or may be user plane data of another terminal device that is within a coverage area of the second terminal device and that uses a wireless local area network communication capability provided by the second terminal device.

S1502*b*: The access network device replaces the source IP address of the message corresponding to the second uplink data with IP@3 and the port number (port) with 3, and sends, to the application server by using the fixed network gateway device, second uplink data obtained after the source IP address is replaced.

S1503: The access network device obtains downlink data from the application server by using the fixed network gateway device, where a destination IP address of a message corresponding to the downlink data is denoted as IP@3, and a port number is 2.

S1504: The access network device determines, based on the obtained destination IP address of the message corresponding to the downlink data, that the downlink data needs to be sent to the first terminal device, and the access network device replaces the destination IP address of the message corresponding to the downlink data with IP@1, and a port number (port) with 1, and sends, to the first terminal device, downlink data obtained after the destination IP address is replaced.

In Solution 2, the access network device pre-establishes a connection to the fixed network gateway device. For a subsequent connection to the terminal device, the access network device may directly establish a user plane resource to the terminal device and allocate an IP address (if a PPPoE connection is established, the access network device further allocates a PPPoE session identifier), that is, the access network device has a NAT function. An advantage of the access network device is that only one or a few connections need to be established between the access network device and the fixed network gateway device, and the access network device may directly determine, based on an authorization and authentication result (or subscription data) of the terminal device, whether to establish the user plane resource with the terminal device and allocate the IP address.

Corresponding to the foregoing embodiment, refer FIG. 16. An embodiment of this application provides a communication apparatus 1600. The communication apparatus 1600 includes a communication module 1601 and a processing module 1602. The communication apparatus 1600 may be an access network device, or may be an apparatus that is used in an access network device and that can support the access network device in performing the foregoing communication method.

The communication module may also be referred to as a transceiver module, a transceiver, a transceiver machine, a transceiver apparatus, or the like. The processing module may also be referred to as a processor, a processing board, a processing unit, a processing apparatus, or the like. Optionally, a device that is in the communication module and that is configured to implement a receiving function may be considered as a receiving unit. It should be understood that the communication module is configured to perform a sending operation and a receiving operation on an access network device side in the foregoing method embodiments, and a device that is in the communication module and that is configured to implement a sending function is considered as a sending unit. In other words, the communication module includes the receiving unit and the sending unit. When the communication apparatus 1600 is used in an access network device, the receiving unit included in the communication module 1601 is configured to perform the receiving operation on the access network device side, for example, receive fourth information from a first terminal device; and the sending unit included in the communication module 1601 is configured to perform the sending operation on the access network device side, for example, send second information to a first fixed network gateway device. In addition, it should be noted that, if the apparatus is implemented by using a chip/chip circuit, the communication module may be an input/output circuit and/or a communication interface, and performs an input operation (which corresponds to the foregoing receiving operation) and an output operation (which corresponds to the foregoing sending operation). The processing module is an integrated processor, a microprocessor, or an integrated circuit.

The following describes in detail an implementation in which the communication apparatus 1600 is used in the access network device.

The communication apparatus 1600 includes:

the communication module 1601, configured to obtain first information; and the processing module 1602, configured to establish a user plane connection to a first terminal device based on the first information, where the communication module 1601 is further configured to: obtain user plane data of the first terminal device via the user plane connection, and send the user plane data to a first fixed network gateway device.

In this embodiment of this application, the access network device supporting the 3GPP access technology is used as an intermediate node between a terminal device and a fixed network gateway device, the terminal device establishes a connection to the access network device by using the 3GPP access technology, and the access network device can transmit data of the terminal device to the fixed network gateway device, so that the terminal device can also obtain a fixed network broadband service in a 3GPP access manner. Compared with a conventional manner in which a fixed network terminal accesses a fixed network in a wireline manner, the 3GPP access manner can simplify deployment, enhance coverage, and improve performance of a communication system.

In an optional implementation, the first information indicates that a type of the first terminal device is a target type and/or indicates that the first terminal device is allowed to obtain a service by using the first fixed network gateway device. The target type includes one or more of a residential gateway, a home terminal, and customer-premises equipment, and may further include a mobile phone, an AR terminal/a VR terminal, a Pad, and another type of terminal. This is not limited in embodiments of this application.

In an optional implementation, the first information is from the first terminal device, and the first information indicates that the type of the first terminal device is the target type, and may further include the mobile phone, the AR/VR terminal, the Pad, and the another type of terminal. This is not limited in embodiments of this application.

In an optional implementation, the first information is pre-configured in the access network device or the first information is from the first fixed network gateway device. The first information includes subscription data information corresponding to the first terminal device, and the subscription data information is used to determine that the first terminal device is allowed to obtain the service by using the first fixed network gateway device.

In an optional implementation, before the communication module 1601 obtains the user plane data of the first terminal device through the user plane connection, the communication module 1601 is further configured to send second information to the first fixed network gateway device, where the second information is used to request to manage a connection between the first terminal device and the first fixed network gateway device.

In an optional implementation, the communication module 1601 is further configured to receive third information from the first fixed network gateway device. The third information includes at least one of the following: identification information of the first terminal device; authentication information of the first terminal device, where the authentication information indicates that the first terminal device passes authentication of a fixed network corresponding to the first fixed network gateway device; subscription data information corresponding to the first terminal device, where the subscription data information includes one or more pieces of fixed network service information, QoS information, and priority information; and security context information of the first terminal device, where the security context information is used to establish a security connection between the access network device and the first terminal device.

In an optional implementation, the processing module 1602 is further configured to perform a user plane connection management procedure based on the third information. The user plane management procedure includes at least one of the following operations: establishing a user plane resource, modifying a user plane resource, or releasing a user plane resource.

In an optional implementation, the access network device establishes a connection with at least one fixed network gateway device. The at least one fixed network gateway device includes the first fixed network gateway device.

In an optional implementation, the communication module 1601 is further configured to obtain fourth information from the first terminal device. The fourth information is used to determine security context information of the first terminal device. The processing module is further configured to establish, based on the fourth information, the security connection between the access network device and the first terminal device by using the security context information of the first terminal device.

In an optional implementation, the fourth information includes a first sequence number corresponding to the security context information of the first terminal device. The processing module 1602 is further configured to: obtain, by using the communication module 1601, security context information of at least one terminal device and an identifier set, where the identifier set includes a first sequence number set used to indicate the security context information of the at least one terminal device, and the first sequence number set includes the first sequence number; obtain, based on the first sequence number, the security context information of the first terminal device from the security context information of the at least one terminal device; and establish the security connection between the access network device and the first terminal device by using the security context information of the first terminal device.

In an optional implementation, the identifier set further includes a second sequence number set. The processing module 1602 is further configured to: after establishing the security connection between the access network device and the first terminal device by using the security context information of the first terminal device, replace the first sequence number with a second sequence number in the second sequence number set. The communication module 1601 is further configured to send the second sequence number to the first terminal device, where the second sequence number is used to indicate the security context information of the first terminal device.

In an optional implementation, the fourth information further includes identification information of the fixed network corresponding to the first fixed network gateway device.

In an optional implementation, the communication module 1601 is further configured to send at least one piece of the following information: capability information of the access network device, where the capability information indicates that the access network device supports fixed network transmission; identification information of a fixed network supported by the access network device, where the fixed network supported by the access network device includes the fixed network corresponding to the first fixed network gateway device; and network priority information, where the network priority information indicates a priority of a mobile operator to which the access network device belongs.

In an optional implementation, the communication module 1601 obtains information that is sent by the first terminal device and that indicates that the type of the first terminal device is the target type and/or identification information of a fixed network that the first terminal device requests to access. The processing module 1602 is further configured to determine, based on the type of the first terminal device and/or the identification information of the fixed network that the first terminal device requests to access, that the access network device supports fixed network transmission of the first terminal device.

Division into the modules in embodiments of this application is an example, is only division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Based on a same technical concept, this application further provides a communication apparatus 1700. The communication apparatus 1700 may be a chip or a chip system. Optionally, in this embodiment of this application, the chip system may include a chip, or may include a chip and another discrete device.

The communication apparatus 1700 may be configured to implement functions of the terminal device, the access network device, or the fixed network gateway device in the communication system shown in FIG. 5. The communication apparatus 1700 may include at least one processor 1710. The processor 1710 is coupled to a memory. Optionally, the memory may be located in the apparatus, the memory may be integrated with the processor, or the memory may be located outside the apparatus. For example, the communication apparatus 1700 may further include at least one memory 1720. The memory 1720 stores a computer program, configuration information, a computer program, instructions, and/or data that are/is necessary for implementing any one of the foregoing embodiments. The processor 1710 may execute the computer program stored in the memory 1720, to complete the method in any one of the foregoing embodiments.

The coupling in this embodiment of this application may be an indirect coupling or a communication connection between apparatuses, units, or modules in an electrical form, a mechanical form, or another form, and is used for information exchange between the apparatuses, the units, or the modules. The processor 1710 may operate in collaboration with the memory 1720. In this embodiment of this application, a specific connection medium between the communication interface 1730, the processor 1710 and the memory 1720 is not limited.

The communication apparatus 1700 may further include a communication interface 1730, and the communication apparatus 1700 may perform information exchange with another device through the communication interface 1730. For example, the communication interface 1730 may be a transceiver, a circuit, a bus, a module, or another type of communication interface. When the communication apparatus 1700 is a chip apparatus or a circuit, the communication interface 1730 in the apparatus 1700 may also be an input/output circuit, and may input information (or referred to as receiving information) and output information (or referred to as sending information). The processor is an integrated processor, a microprocessor, an integrated circuit, or a logic circuit. The processor may determine output information based on input information.

Figure 17:
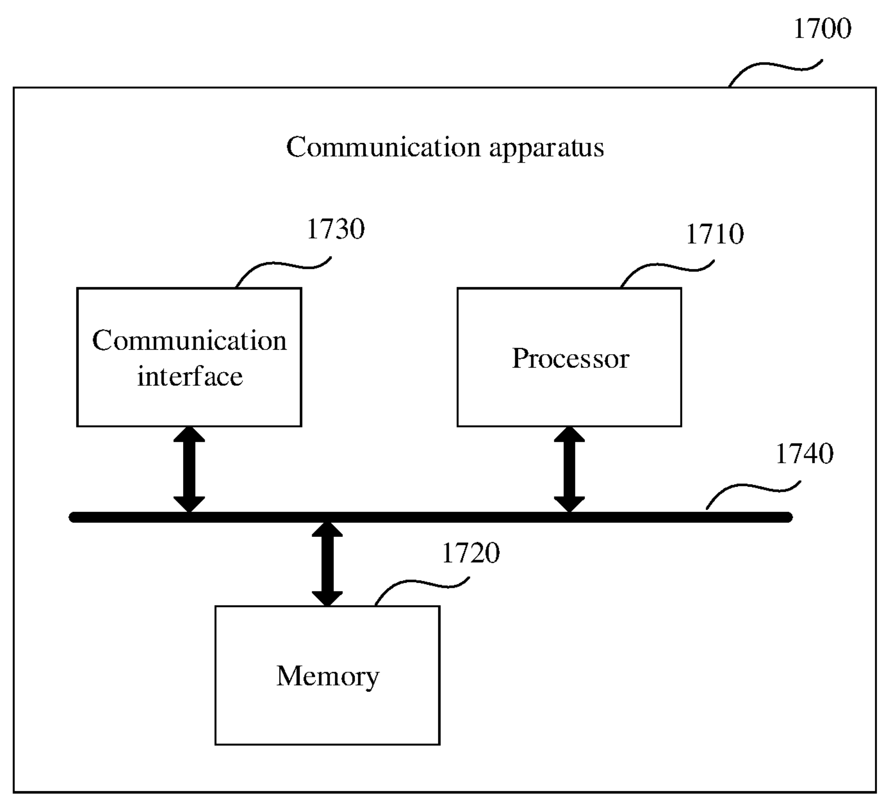
FIG. 17 is a schematic diagram of a structure of another communication apparatus according to an embodiment of this application.

Optionally, as shown in FIG. 17, the communication interface 1730, the processor 1710, and the memory 1720 are connected to each other through a bus 1740. The bus 1740 may be a peripheral component interconnect (PCI) bus, an extended industry standard architecture (EISA) bus, or the like. The bus may be classified into an address bus, a data bus, a control bus, and the like. For ease of indication, only one thick line used to represent the bus in FIG. 17. However, it does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware assembly, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (HDD) or a solid-state drive (SSD), or may be a volatile memory, for example, a random access memory (RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

In a possible implementation, the communication apparatus 1700 may be used in a terminal device. Specifically, the communication apparatus 1700 may be a terminal device, or may be an apparatus that can support a terminal device in implementing a function of the terminal device in any one of the foregoing embodiments. The memory 1720 stores a necessary computer program, a computer program, instructions and/or data for implementing the function of the terminal device in any one of the foregoing embodiments. The processor 1710 may execute the computer program stored in the memory 1720, to complete the method performed by the terminal device in any one of the foregoing embodiments. The method is applied to the terminal device.

The communication interface in the communication apparatus 1700 may be configured to interact with a network device, and send information to the network device or receive information from the network device.

In a possible implementation, the communication apparatus 1700 may be used in an access network device. Specifically, the communication apparatus 1700 may be an access network device, or may be an apparatus that can support an access network device in implementing a function of the access network device in any one of the foregoing embodiments. The memory 1720 stores a necessary computer program, a computer program, instructions and/or data for implementing the function of the access network device in any one of the foregoing embodiments. The processor 1710 may execute the computer program stored in the memory 1720, to complete the method performed by the access network device in any one of the foregoing embodiments. The method is applied to the access network device. The communication interface in the communication apparatus 1700 may be configured to interact with a terminal device, and send information to the terminal device or receive information from the terminal device. Alternatively, the communication interface in the communication apparatus 1700 may be configured to interact with a fixed network gateway device, and send information to the fixed network gateway device or receive information from the fixed network gateway device.

In a possible implementation, the communication apparatus 1700 is used in a fixed network gateway device. Specifically, the communication apparatus 1700 may be a fixed network gateway device, or may be an apparatus that can support a fixed network gateway device and implement a function of the fixed network gateway device in any one of the foregoing embodiments. The memory 1720 stores a necessary computer program, a computer program, instructions and/or data for implementing the function of the fixed network gateway device in any one of the foregoing embodiments. The processor 1710 may execute the computer program stored in the memory 1720, to complete the method performed by the fixed network gateway device in any one of the foregoing embodiments. The method is applied to the fixed network gateway device. The communication interface in the communication apparatus 1700 may be configured to interact with an access network device, and send information to the access network device or receive information from the access network device.

The communications apparatus 1700 provided in this embodiment is used in a terminal device to complete the method performed by the terminal device, or is used in a network device to complete the method performed by the network device. Therefore, for the technical effect that can be obtained by the communications apparatus 1700, refer to the foregoing method embodiments. Details are not described herein again.

In embodiments of this application, the processor may be a general-purpose processor, a digital signal processor, an application-specific integrated circuit, a field programmable gate array or another programmable logic device, a discrete gate or transistor logic device, or a discrete hardware assembly, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (HDD) or a solid-state drive (SSD), or may be a volatile memory, for example, a random access memory (RAM). The memory may alternatively be any other medium that can be configured to carry or store expected program code in a form of an instruction or a data structure and that can be accessed by a computer, but is not limited thereto. The memory in embodiments of this application may alternatively be a circuit or any other apparatus that can implement a storage function, and is configured to store a computer program, or instructions, and/or data.

Based on the foregoing embodiments, an embodiment of this application further provides a computer program. When the computer program is run on a computer, the computer is enabled to perform, from a perspective of a terminal device side or a network device side, the data transmission method provided in the embodiments shown in FIG. 6, FIG. 9A and FIG. 9B, FIG. 10, FIG. 11A and FIG. 11B, and FIG. 14A and FIG. 14B.

Based on the foregoing embodiments, an embodiment of this application further provides a computer-readable storage medium. The computer-readable storage medium stores a computer program. When the computer program is executed by a computer, so that the computer performs, from a perspective of a terminal device side or a network device side, the data transmission method provided in the foregoing method embodiments. The storage medium may be any available medium that can be accessed by the computer. The following provides an example but does not impose a limitation: The computer-readable medium may include a RAM, a ROM, an EEPROM, a CD-ROM, or another compact disc storage, or a magnetic disk storage medium, or another magnetic storage device, or any other medium that can carry or store expected program code in a form of an instruction or a data structure and can be accessed by a computer.

Based on the foregoing embodiments, an embodiment of this application provides a communication system, including a terminal device, an access network device, and a fixed network gateway device. The terminal device, the network device, and the fixed network gateway device may implement the communication method provided in the foregoing embodiments.

Based on the foregoing embodiments, an embodiment of this application further provides a chip. The chip is configured to read a computer program stored in a memory, and implement, from a perspective of a terminal device side or a network device side, the data transmission method provided in the foregoing method embodiments.

Based on the foregoing embodiments, an embodiment of this application provides a chip system. The chip system includes a processor, configured to support a computer apparatus in implementing functions of a terminal device, an access network device, or a fixed network gateway device according to the foregoing embodiments. In a possible design, the chip system further includes a memory. The memory is configured to store a program and data that are necessary for the computer apparatus. The chip system may include a chip, or may include a chip and another discrete device.

All or a part of the technical solutions provided in embodiments of this application may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireline (for example, a coaxial cable, an optical fiber, or a digital subscriber line (digital subscriber line, DSL)) or wireless (for example, infrared, radio, or microwave) manner. The computer-readable storage medium may be any available medium accessible by the computer, or a data storage device such as a server or a data center, integrating one or more available media. The available medium may be a magnetic medium (for example, a floppy disk, a hard disk, or a magnetic tape), an optical medium (for example, a digital video disc (digital video disc, DVD)), a semiconductor medium, or the like.

In embodiments of this application, when there is no logical conflict, embodiments may be mutually referenced. For example, methods and/or terms in the method embodiments may be mutually referenced. For example, functions and/or terms in the apparatus embodiments may be mutually referenced. For example, functions and/or terms between the apparatus embodiments and the method embodiments may be mutually referenced.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:

obtaining, by an access network device, first information indicating that a first terminal device is of a target type or is allowed to obtain a service by using a first fixed network gateway device, wherein the access network device supports a 3$^{rd}$ generation partnership project (3GPP) access technology;

establishing, by the access network device, a user plane connection to the first terminal device based on the first information via the 3GPP access technology; and obtaining, by the access network device, user plane data of the first terminal device via the user plane connection, and sending the user plane data to the first fixed network gateway device, wherein the first fixed network gateway device is connected to a fixed network that provides broadband services through broadband transmission protocols.

2. The method according to claim 1, wherein target type comprises one or more of a residential gateway, a home terminal, and customer-premises equipment.

3. The method according to claim 2, wherein the first information is from the first terminal device, and the first information indicates that a type of the first terminal device is the target type.

4. The method according to claim 1, wherein the first information is pre-configured in the access network device or the first information is from the first fixed network gateway device; and wherein the first information comprises subscription data information corresponding to the first terminal device, and the subscription data information is used to determine that the first terminal device is allowed to obtain the service by using the first fixed network gateway device.

5. The method according to claim 1, further comprising:

sending, by the access network device, second information to the first fixed network gateway device, wherein the second information requests to manage a connection between the first terminal device and the first fixed network gateway device.

6. The method according to claim 5, further comprising:

receiving, by the access network device, third information from the first fixed network gateway device, wherein the third information comprises at least one of the following:

identification information of the first terminal device;

authentication information of the first terminal device, wherein the authentication information indicates that the first terminal device passes authentication of a fixed network corresponding to the first fixed network gateway device;

subscription data information of the first terminal device, wherein the subscription data information comprises one or more pieces of fixed network service information, quality of service (QoS) information, or priority information; or security context information of the first terminal device, wherein the security context information is used to establish a security connection between the access network device and the first terminal device; and performing, by the access network device, a user plane connection management procedure based on the third information, wherein the user plane connection management procedure comprises at least one of the following operations: establishing a user plane resource, modifying a user plane resource, or releasing a user plane resource.

7. The method according to claim 1, further comprising:

establishing, by the access network device, a connection with at least one fixed network gateway device, wherein the at least one fixed network gateway device comprises the first fixed network gateway device.

8. The method according to claim 1, further comprising:

obtaining, by the access network device, fourth information from the first terminal device, wherein the fourth information is used to determine security context information of the first terminal device; and establishing, by the access network device based on the fourth information, a security connection between the access network device and the first terminal device by using the security context information of the first terminal device.

9. The method according to claim 8, wherein the fourth information comprises a first sequence number corresponding to the security context information of the first terminal device; and wherein establishing, by the access network device based on the fourth information, the security connection between the access network device and the first terminal device by using the security context information of the first terminal device comprises:

obtaining, by the access network device, security context information of at least one terminal device and an identifier set, wherein the identifier set comprises a first sequence number set indicating the security context information of the at least one terminal device, and the first sequence number set comprises the first sequence number;

obtaining, by the access network device based on the first sequence number, the security context information of the first terminal device from the security context information of the at least one terminal device; and establishing, by the access network device, the security connection between the access network device and the first terminal device by using the security context information of the first terminal device.

10. The method according to claim 8, wherein the fourth information further comprises identification information of a fixed network corresponding to the first fixed network gateway device.

11. The method according to claim 10, further comprising:

sending, by the access network device, at least one piece of the following information:

capability information of the access network device, wherein the capability information indicates that the access network device supports fixed network transmission;

identification information of the fixed network supported by the access network device; and network priority information, wherein the network priority information indicates a priority of a mobile operator to which the access network device belongs.

12. The method according to claim 8, further comprising:

obtaining, by the access network device, information from the first terminal device which indicates that a type of the first terminal device is the target type or identification information of a fixed network that the first terminal device requests to access, wherein the target type comprises one or more of a residential gateway, a home terminal, and customer-premises equipment; and determining, by the access network device based on the type of the first terminal device or the identification information of the fixed network that the first terminal device requests to access, that the access network device supports fixed network transmission of the first terminal device.

13. A communication apparatus, used in an access network device supporting a 3$^{rd}$ generation partnership project (3GPP) access technology, the communication apparatus comprising:

a communication interface, configured to obtain first information indicating that a first terminal device is of a target type or is allowed to obtain a service by using a first fixed network gateway device;

at least one processor; and a non-transitory computer readable storage medium storing a program that is executable by the at least one processor, the program including instructions to:

establish a user plane connection to the first terminal device based on the first information via the 3GPP access technology; and obtain, using the communication interface, user plane data of the first terminal device via the user plane connection, and send the user plane data to the first fixed network gateway device, wherein the first fixed network gateway device is connected to a fixed network that provides broadband services through broadband transmission protocols.

14. The communication apparatus according to claim 13, wherein the target type comprises one or more of a residential gateway, a home terminal, and customer-premises equipment; and wherein:

the first information is from the first terminal device, and the first information indicates that a type of the first terminal device is the target type, or the first information is pre-configured in the access network device or the first information is from the first fixed network gateway device, and the first information comprises subscription data information corresponding to the first terminal device, and the subscription data information is used to determine that the first terminal device is allowed to obtain the service by using the first fixed network gateway device.

15. The communication apparatus according to claim 13, wherein the communication interface is further configured to:

send second information to the first fixed network gateway device, wherein the second information requests to manage a connection between the first terminal device and the first fixed network gateway device.

16. The communication apparatus according to claim 15, wherein the communication interface is further configured to receive third information from the first fixed network gateway device, wherein the third information comprises at least one of the following:

identification information of the first terminal device;

authentication information of the first terminal device, wherein the authentication information indicates that the first terminal device passes authentication of a fixed network corresponding to the first fixed network gateway device;

subscription data information of the first terminal device, wherein the subscription data information comprises one or more pieces of fixed network service information, quality of service (QoS) information, or priority information; and security context information of the first terminal device, wherein the security context information is used to establish a security connection between the access network device and the first terminal device; and wherein the program further includes instructions to perform a user plane connection management procedure based on the third information, wherein the user plane connection management procedure comprises at least one of the following operations: establishing a user plane resource, modifying a user plane resource, or releasing a user plane resource.

17. The communication apparatus according to claim 13, wherein the communication interface is further configured to obtain fourth information from the first terminal device, wherein the fourth information is used to determine security context information of the first terminal device; and wherein the program further includes instructions to establish, based on the fourth information, a security connection between the access network device and the first terminal device by using the security context information of the first terminal device.

18. The communication apparatus according to claim 17, wherein the fourth information comprises a first sequence number corresponding to the security context information of the first terminal device, and the program further includes instructions to:

obtain, by using the communication interface, security context information of at least one terminal device and an identifier set, wherein the identifier set comprises a first sequence number indicating the security context information of the at least one terminal device, and a first sequence number set comprises the first sequence number;

obtain, based on the first sequence number, the security context information of the first terminal device from the security context information of the at least one terminal device; and establish the security connection between the access network device and the first terminal device by using the security context information of the first terminal device.

19. A non-transitory computer readable medium, wherein the non-transitory computer readable medium comprises instructions, and when the instructions are run on a computer, the computer is enabled to perform:

obtaining first information indicating that a first terminal device is of a target type or is allowed to obtain a service by using a first fixed network gateway device;

establishing a user plane connection to the first terminal device based on the first information via a $3^{rd}$ generation partnership project (3GPP) access technology; and obtaining user plane data of the first terminal device via the user plane connection, and sending the user plane data to the first fixed network gateway device, wherein the first fixed network gateway device is connected to a fixed network that provides broadband services through broadband transmission protocols.

20. A communication system, comprising:

an access network device; and a first fixed network gateway device;

wherein the access network device is configured to perform:

obtaining first information indicating that a first terminal device is of a target type or is allowed to obtain a service by using the first fixed network gateway device;

establishing a user plane connection to the first terminal device based on the first information via a $3^{rd}$ generation partnership project (3GPP) access technology; and obtaining user plane data of the first terminal device via the user plane connection, and sending the user plane data to the first fixed network gateway device, wherein the first fixed network gateway device is connected to a fixed network that provides broadband services through broadband transmission protocols.

* * * * *